(12) United States Patent
Shinomiya

(10) Patent No.: US 12,717,883 B2
(45) Date of Patent: Aug. 25, 2026

(54) IMAGING APPARATUS, INFORMATION PROCESSING METHOD, AND PROGRAM

(71) Applicant: SONY GROUP CORPORATION, Tokyo (JP)

(72) Inventor: Jun Shinomiya, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 153 days.

(21) Appl. No.: 17/907,830

(22) PCT Filed: Mar. 16, 2021

(86) PCT No.: PCT/JP2021/010489

§ 371 (c)(1),
(2) Date: Aug. 29, 2022

(87) PCT Pub. No.: WO2021/200091

PCT Pub. Date: Oct. 7, 2021

(65) Prior Publication Data

US 2023/0142023 A1 May 11, 2023

(30) Foreign Application Priority Data

Mar. 30, 2020 (JP) ................................. 2020-060927

(51) Int. Cl.
*G06F 21/10* (2013.01)
*G06F 21/62* (2013.01)
(Continued)

(52) U.S. Cl.
CPC ........ *G06F 21/105* (2013.01); *G06F 21/6218* (2013.01); *G06F 21/64* (2013.01); *H04N 23/66* (2023.01); *G06F 21/1015* (2023.08)

(58) Field of Classification Search
CPC ... H04L 9/3247; H04L 9/3239; H04L 9/0643; H04L 63/08; H04L 9/0866; H04L 9/0861;
(Continued)

(56) References Cited

U.S. PATENT DOCUMENTS 6,961,441 B1 11/2005 Hershey
8,908,058 B2 * 12/2014 Akeley ............... H04N 9/8205 348/222.1

(Continued)

FOREIGN PATENT DOCUMENTS

EP 3754524 A1 12/2020
JP 2006-197118 A 7/2006

(Continued)

*Primary Examiner* — Tae K Kim
(74) *Attorney, Agent, or Firm* — Paratus Law Group, PLLC

(57) ABSTRACT

There is provided an imaging apparatus, an information processing method, and a program that make it possible to control imaging by strangers. An electronic signature including signature metadata including imaging apparatus identification information that is identification information regarding the imaging apparatus and user identification information and a hash value of a captured image generated by imaging a subject is associated with the captured image. Further, imaging is controlled on the basis of license information that is information regarding a license and includes imaging apparatus identification information that is identification information regarding the imaging apparatus, user identification information, and an imaging parameter that is a parameter for imaging. The present disclosure is applicable to an image processing apparatus, an information processing apparatus, an imaging apparatus, an electronic apparatus, an information processing method, or a program, for example.

20 Claims, 20 Drawing Sheets

350

<KEY FORMAT>
·SYSTEM-UNIQUE INFORMATION (ID UNIQUE TO KEY IN SYSTEM)
·VALIDITY PERIOD
(E.G., WITHIN VALIDITY PERIOD, ACTIVATION BASED ON SET INFORMATION AND ADDITION OF SIGNATURE ARE ALLOWED)
(E.G., OUTSIDE VALIDITY PERIOD, DEACTIVATION IS PERFORMED, ADDITION OF SIGNATURE IS PROHIBITED, OR ADDITION OF COMPANY NAME AS OWNER IS REQUIRED)
·APPARATUS-SPECIFIC ID
·USER FIDO PUBLIC KEY (IN CASE WHERE FIDO IS USED)
·SIGNATURE METAINFORMATION
APPARATUS-SPECIFIC ID
USER ID
COMPANY NAME
·IMAGING PARAMETER
ONLY HD PHOTOGRAPHING IS ALLOWED (4K PHOTOGRAPHING IS PROHIBITED), OR 4K PHOTOGRAPHING IS ALLOWED ONLY IN LICENSE PERIOD, FOR EXAMPLE (SETTING CONTROL)
TIME OR PLACE IS LIMITED WITH GPS (CONTEXT CONTROL IN PHOTOGRAPHING)
ACTIVATION IS ALLOWED WHEN SPECIFIC OBJECT IS RECOGNIZED ON SPOT IN TEST PHOTOGRAPHING (CONTEXT CONTROL IN PHOTOGRAPHING)
CREDIT IS AUTOMATICALLY ADDED TO CAPTURED IMAGE

(51) Int. Cl.
*G06F 21/64* (2013.01)
*H04N 23/66* (2023.01)

(58) Field of Classification Search
CPC ......... H04L 9/32; G06F 21/10; G06F 21/101; G06F 21/1015; G06F 21/1011; G06F 21/105; G06F 21/00; G06F 21/107
See application file for complete search history.

(56) References Cited

U.S. PATENT DOCUMENTS

2002/0083323 A1* 6/2002 Cromer ................. H04L 9/3234 713/176
2003/0123700 A1 7/2003 Wakao
2003/0126444 A1* 7/2003 Wakao ............... H04N 1/32101 713/176
2004/0010486 A1* 1/2004 MacQueen ............. G06F 21/10 707/E17.02
2005/0226413 A1* 10/2005 Wada ................. H04N 1/00145 348/231.2
2009/0216769 A1* 8/2009 Bellwood ............... G06F 21/10 707/999.009
2010/0312810 A1* 12/2010 Horton .................... G06F 21/10 707/812
2016/0379330 A1* 12/2016 Powers ................. G06T 1/0028 382/100
2017/0255762 A1* 9/2017 Kosovan ............... G06F 21/121
2017/0302457 A1* 10/2017 Nakamoto ................ H04L 9/30
2017/0332050 A1* 11/2017 Yamashita ........... G06V 40/172
2017/0344728 A1* 11/2017 Steele ................... H04L 9/3231
2018/0218364 A1* 8/2018 Cantrell ................. G06Q 20/36

FOREIGN PATENT DOCUMENTS

JP 2007-036985 A 2/2007
JP 2008-022372 A 1/2008
JP 2014-146073 A 8/2014
JP 2017192076 A 10/2017
JP 2018-038029 A 3/2018
WO WO 2016/063942 A1 4/2016
WO WO-2019159690 A1 8/2019
WO WO 2020/059747 A1 3/2020

* cited by examiner

10
COMPANY
21
CAMERA
22
CAMERA
23
CAMERA
31
USER
34
USER
32
USER
33
USER
41
42
ID
Cam ID
copyright
ABC company
Photographer
A
parameters
XXXX 201
CPU
202
ROM
203
RAM
204
INPUT-OUTPUT INTERFACE
210
INPUT UNIT
211
OUTPUT UNIT
212
STORAGE UNIT
213
COMMUNICATION UNIT
214
DRIVE
215
REMOVABLE RECORDING MEDIUM
221
110
(120)
(130)

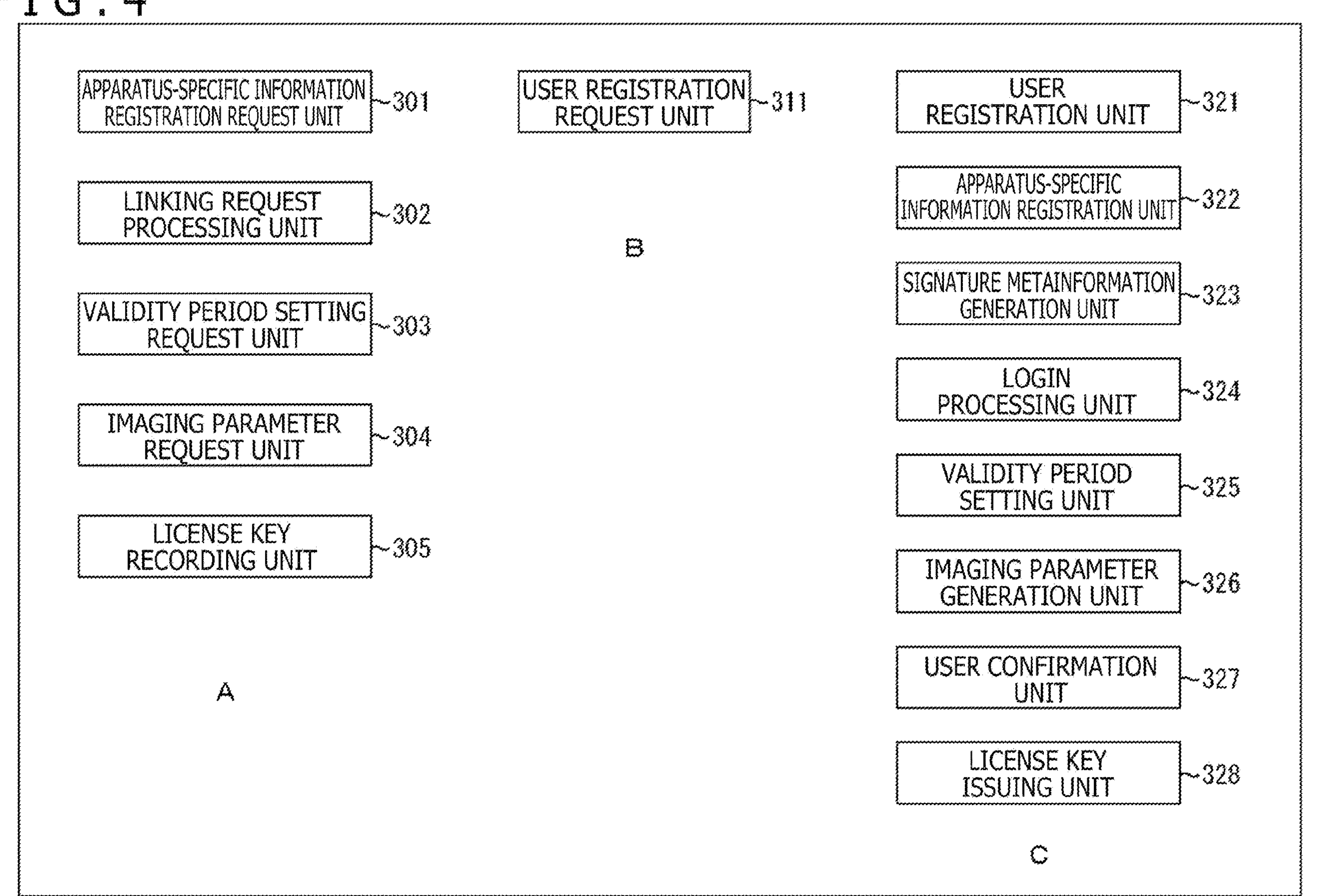
FIG. 4
APPARATUS-SPECIFIC INFORMATION REGISTRATION REQUEST UNIT
301
LINKING REQUEST PROCESSING UNIT
302
VALIDITY PERIOD SETTING REQUEST UNIT
303
IMAGING PARAMETER REQUEST UNIT
304
LICENSE KEY RECORDING UNIT
305
A
USER REGISTRATION REQUEST UNIT
311
B
USER REGISTRATION UNIT
321
APPARATUS-SPECIFIC INFORMATION REGISTRATION UNIT
322
SIGNATURE METAINFORMATION GENERATION UNIT
323
LOGIN PROCESSING UNIT
324
VALIDITY PERIOD SETTING UNIT
325
IMAGING PARAMETER GENERATION UNIT
326
USER CONFIRMATION UNIT
327
LICENSE KEY ISSUING UNIT
328
C 401
CPU
402
ROM
403
RAM
404
431
IMAGING UNIT
INPUT-OUTPUT INTERFACE
410
INPUT UNIT
411
OUTPUT UNIT
412
STORAGE UNIT
413
COMMUNICATION UNIT
414
DRIVE
415
REMOVABLE RECORDING MEDIUM
421
140

LOGIN PROCESSING UNIT
441
APPARATUS-SPECIFIC COMMON KEY GENERATION UNIT
442
LICENSE KEY VERIFICATION UNIT
443
ACTIVATION PROCESSING UNIT
444
USER AUTHENTICATION UNIT
445
TERMS OF USE DETERMINATION UNIT
446
IMAGING SETTING UNIT
447
IMAGING CONTROL UNIT
448
ELECTRONIC SIGNATURE PROCESSING UNIT
449

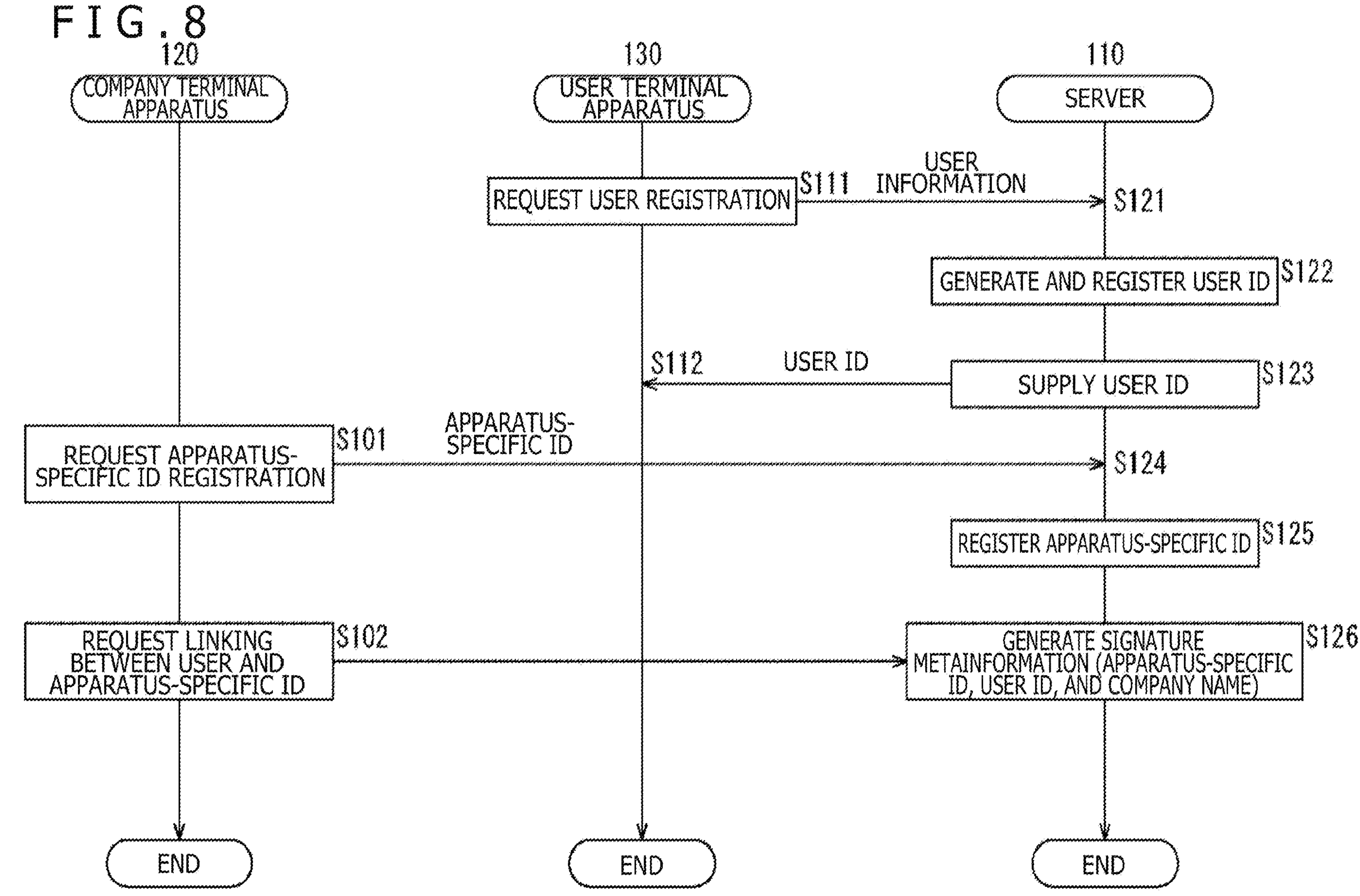
F I G . 8
120
COMPANY TERMINAL APPARATUS
130
USER TERMINAL APPARATUS
110
SERVER
REQUEST USER REGISTRATION
S111
USER INFORMATION
S121
GENERATE AND REGISTER USER ID
S122
S112
USER ID
SUPPLY USER ID
S123
REQUEST APPARATUS-SPECIFIC ID REGISTRATION
S101
APPARATUS-SPECIFIC ID
S124
REGISTER APPARATUS-SPECIFIC ID
S125
REQUEST LINKING BETWEEN USER AND APPARATUS-SPECIFIC ID
S102
GENERATE SIGNATURE METAINFORMATION (APPARATUS-SPECIFIC ID, USER ID, AND COMPANY NAME)
S126
END
END
END

FIG. 9

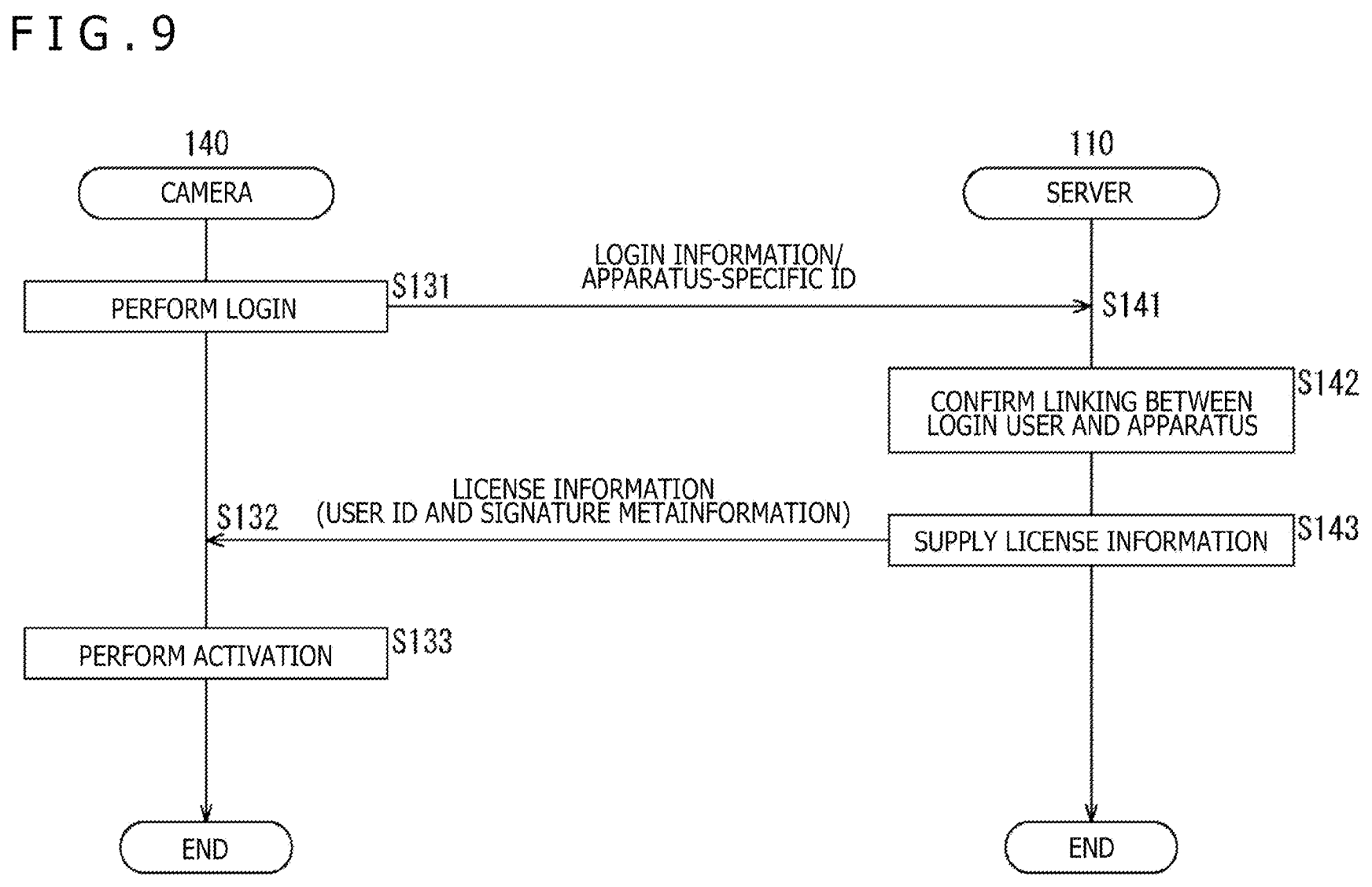

140
CAMERA
PERFORM LOGIN
S131
LOGIN INFORMATION/
APPARATUS-SPECIFIC ID
S132
LICENSE INFORMATION
(USER ID AND SIGNATURE METAINFORMATION)
PERFORM ACTIVATION
S133
END

110
SERVER
S141
CONFIRM LINKING BETWEEN
LOGIN USER AND APPARATUS
S142
SUPPLY LICENSE INFORMATION
S143
END

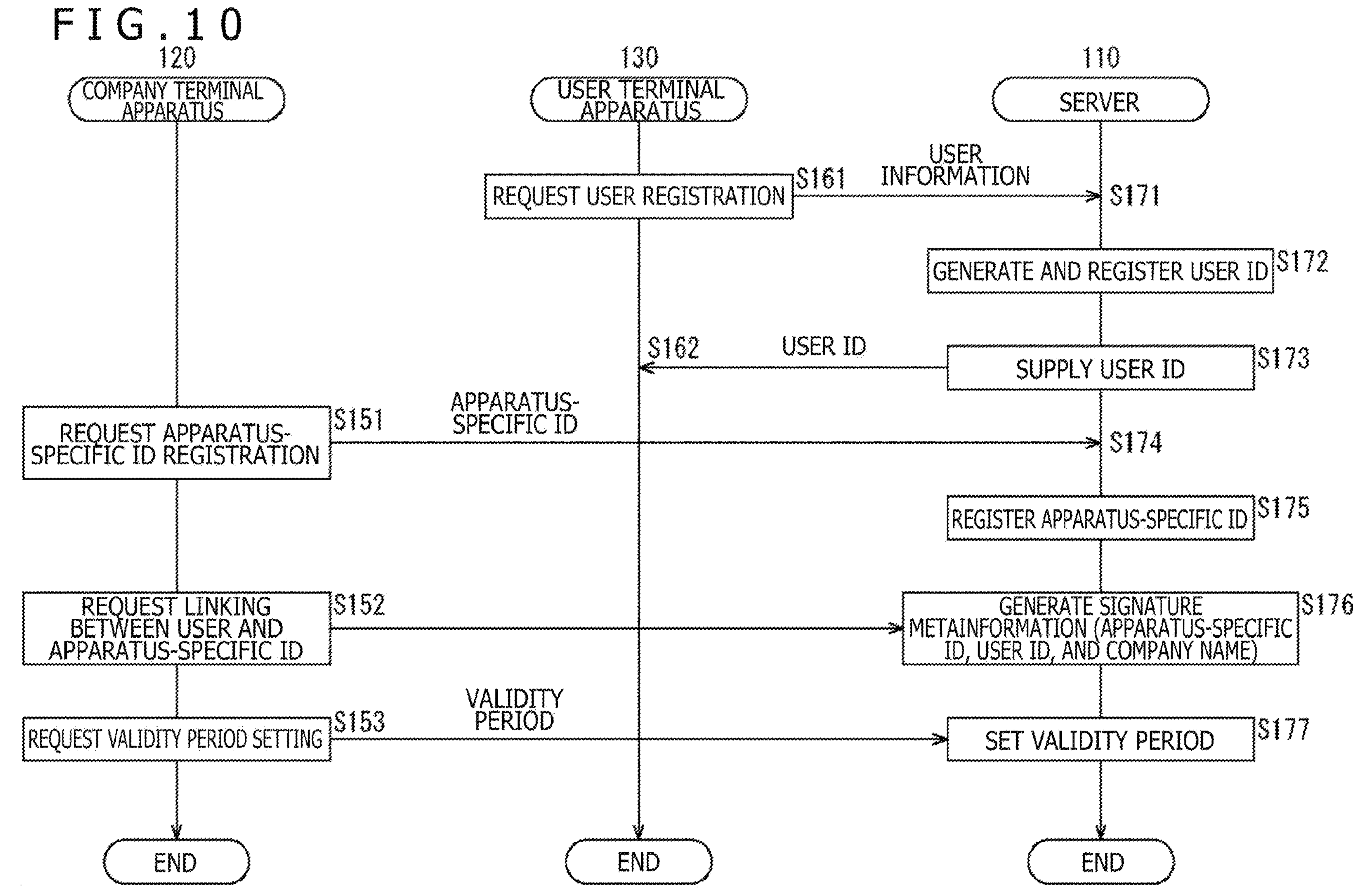
FIG. 10
120
COMPANY TERMINAL APPARATUS
130
USER TERMINAL APPARATUS
110
SERVER
REQUEST USER REGISTRATION
S161
USER INFORMATION
S171
GENERATE AND REGISTER USER ID
S172
S162
USER ID
SUPPLY USER ID
S173
REQUEST APPARATUS-SPECIFIC ID REGISTRATION
S151
APPARATUS-SPECIFIC ID
S174
REGISTER APPARATUS-SPECIFIC ID
S175
REQUEST LINKING BETWEEN USER AND APPARATUS-SPECIFIC ID
S152
GENERATE SIGNATURE METAINFORMATION (APPARATUS-SPECIFIC ID, USER ID, AND COMPANY NAME)
S176
REQUEST VALIDITY PERIOD SETTING
S153
VALIDITY PERIOD
SET VALIDITY PERIOD
S177
END
END
END

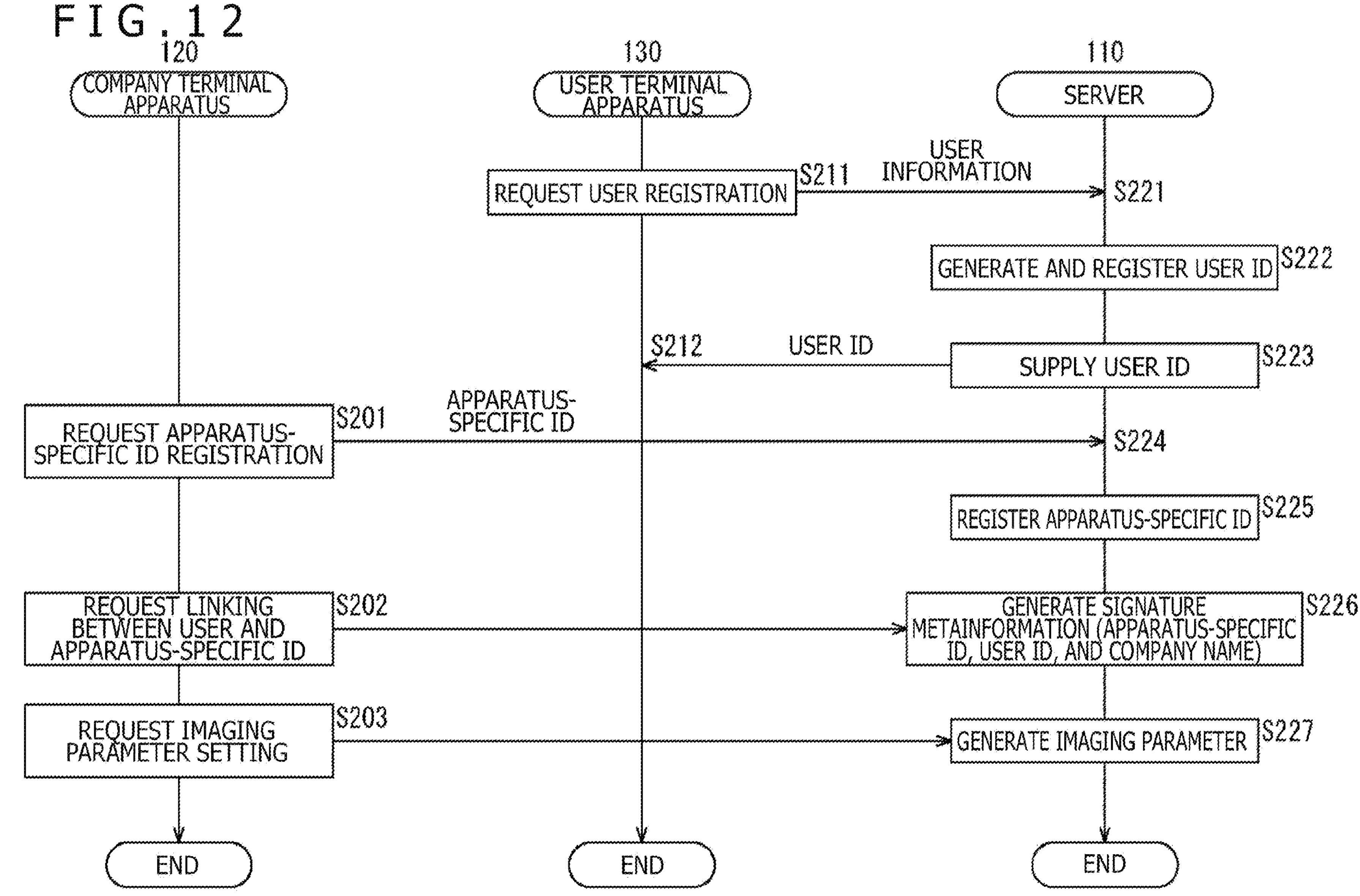
FIG. 12
120
COMPANY TERMINAL APPARATUS
130
USER TERMINAL APPARATUS
110
SERVER
REQUEST USER REGISTRATION
S211
USER INFORMATION
S221
GENERATE AND REGISTER USER ID
S222
S212
USER ID
SUPPLY USER ID
S223
REQUEST APPARATUS-SPECIFIC ID REGISTRATION
S201
APPARATUS-SPECIFIC ID
S224
REGISTER APPARATUS-SPECIFIC ID
S225
REQUEST LINKING BETWEEN USER AND APPARATUS-SPECIFIC ID
S202
GENERATE SIGNATURE METAINFORMATION (APPARATUS-SPECIFIC ID, USER ID, AND COMPANY NAME)
S226
REQUEST IMAGING PARAMETER SETTING
S203
GENERATE IMAGING PARAMETER
S227
END
END
END 140
CAMERA
110
SERVER
PERFORM LOGIN
S231
LOGIN INFORMATION/
APPARATUS-SPECIFIC ID
S241
CONFIRM LINKING BETWEEN
LOGIN USER AND APPARATUS
S242
LICENSE INFORMATION (USER ID, SIGNATURE
METAINFORMATION, AND IMAGING PARAMETER)
S232
SUPPLY LICENSE INFORMATION
S243
PERFORM ACTIVATION
S233
END
END

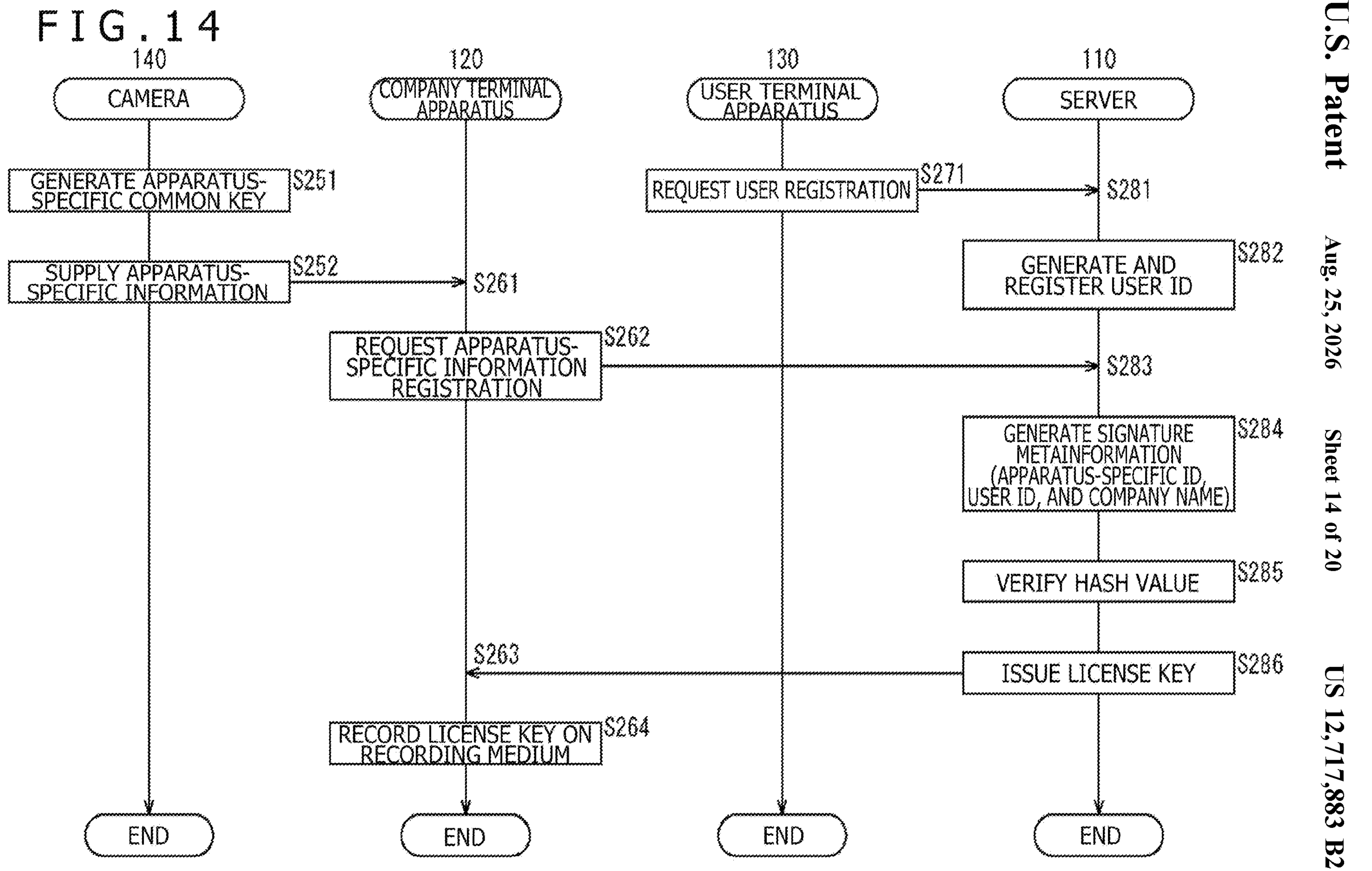
FIG. 14
140
CAMERA
120
COMPANY TERMINAL APPARATUS
130
USER TERMINAL APPARATUS
110
SERVER
GENERATE APPARATUS-SPECIFIC COMMON KEY
S251
REQUEST USER REGISTRATION
S271
S281
SUPPLY APPARATUS-SPECIFIC INFORMATION
S252
S261
GENERATE AND REGISTER USER ID
S282
REQUEST APPARATUS-SPECIFIC INFORMATION REGISTRATION
S262
S283
GENERATE SIGNATURE METAINFORMATION (APPARATUS-SPECIFIC ID, USER ID, AND COMPANY NAME)
S284
VERIFY HASH VALUE
S285
S263
ISSUE LICENSE KEY
S286
RECORD LICENSE KEY ON RECORDING MEDIUM
S264
END
END
END
END

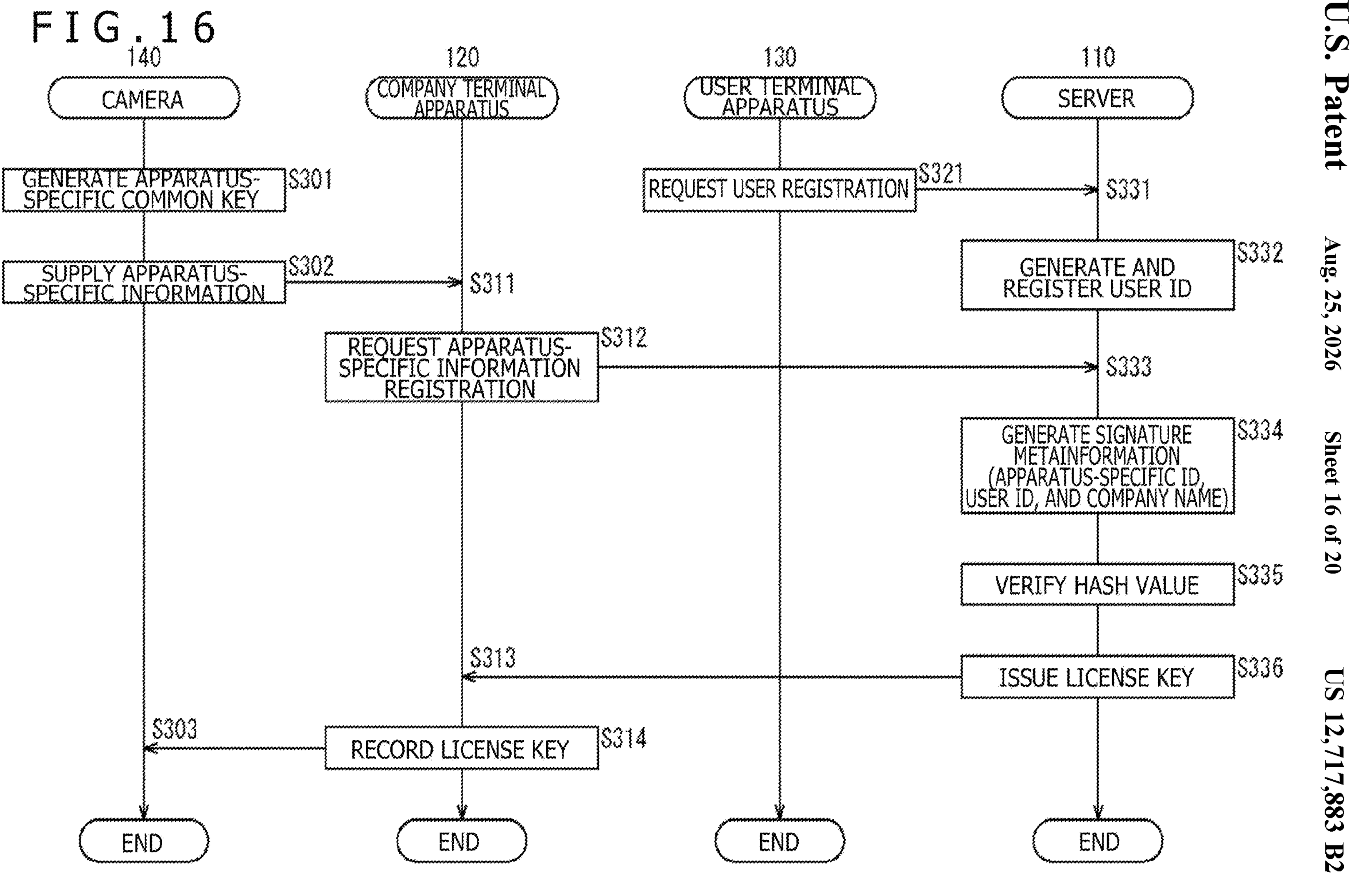
FIG. 16
140
CAMERA
120
COMPANY TERMINAL APPARATUS
130
USER TERMINAL APPARATUS
110
SERVER
GENERATE APPARATUS-SPECIFIC COMMON KEY
S301
REQUEST USER REGISTRATION
S321
S331
GENERATE AND REGISTER USER ID
S332
SUPPLY APPARATUS-SPECIFIC INFORMATION
S302
S311
REQUEST APPARATUS-SPECIFIC INFORMATION REGISTRATION
S312
S333
GENERATE SIGNATURE METAINFORMATION (APPARATUS-SPECIFIC ID, USER ID, AND COMPANY NAME)
S334
VERIFY HASH VALUE
S335
S313
ISSUE LICENSE KEY
S336
S303
RECORD LICENSE KEY
S314
END
END
END
END S501
PHOTOGRAPHING
501
S502
IMAGE HASH VALUE CALCULATION
HASH VALUE OF IMAGE
502
S503
ELECTRONIC SIGNATURE GENERATION
HASH VALUE OF IMAGE
502
+
SIGNATURE METAINFORMATION
503
ELECTRONIC SIGNATURE
504
S504
LINKING BETWEEN IMAGE AND ELECTRONIC SIGNATURE
501
SIGNATURE METAINFORMATION
503
ELECTRONIC SIGNATURE
504

S551
CONTENT ACQUISITION
S552
IMAGE HASH VALUE CALCULATION
S553
ELECTRONIC SIGNATURE GENERATION
S554
VERIFICATION
501
503
SIGNATURE METAINFORMATION
504
ELECTRONIC SIGNATURE
HASH VALUE OF IMAGE
511
HASH VALUE OF IMAGE
511
+
SIGNATURE METAINFORMATION
503
ELECTRONIC SIGNATURE
512
ELECTRONIC SIGNATURE (CALCULATED)
512
COMPARISON
ELECTRONIC SIGNATURE (ACQUIRED)
504

IMAGING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2021/010489 (filed on Mar. 16, 2021) under 35 U.S.C. § 371, which claims priority to Japanese Patent Application No. 2020-060927 (filed on Mar. 30, 2020), which are all hereby incorporated by reference in their entirety.

TECHNICAL FIELD

The present disclosure relates to an imaging apparatus, an information processing method, and a program and, in particular, to an imaging apparatus, an information processing method, and a program that make it possible to control imaging by strangers.

BACKGROUND ART

Hitherto, there has been proposed a method for digital cameras or the like, including converting a captured image or the like to a hash value and giving an electronic signature with the hash value to the captured image, to thereby detect alterations (for example, see PTL 1).

Further, in recent years, a service that rents imaging apparatuses to users has been considered. In such a service, a user who is a stranger to an imaging apparatus provider operates an imaging apparatus provided by the provider to perform imaging, thereby generating captured images.

CITATION LIST

Patent Literature

[PTL 1]
Japanese Patent Laid-open No. 2008-22372

SUMMARY

Technical Problem

The present disclosure makes it possible to control imaging by users who are strangers in such a service, for example.

Solution to Problem

According to one aspect of the present technology, there is provided an imaging apparatus including an association unit configured to associate a captured image with a hash value of signature metadata including imaging apparatus identification information that is identification information regarding the imaging apparatus itself and user identification information.

According to one aspect of the present technology, there is provided an information processing method including associating a captured image with a hash value of signature metadata including imaging apparatus identification information that is identification information regarding an imaging apparatus and user identification information.

According to one aspect of the present technology, there is provided a program for causing a computer to function as an association unit configured to associate a captured image with a hash value of signature metadata including imaging apparatus identification information that is identification information regarding an imaging apparatus and user identification information.

According to another aspect of the present technology, there is provided an imaging apparatus including an imaging control unit configured to control imaging on the basis of license information that is information regarding a license and includes imaging apparatus identification information that is identification information regarding the imaging apparatus itself, user identification information, and an imaging parameter that is a parameter for imaging.

According to another aspect of the present technology, there is provided an information processing method including controlling imaging on the basis of license information that is information regarding a license and includes imaging apparatus identification information that is identification information regarding an imaging apparatus, user identification information, and an imaging parameter that is a parameter for imaging.

According to another aspect of the present technology, there is provided a program for causing a computer to function as an imaging control unit configured to control imaging on the basis of license information that is information regarding a license and includes imaging apparatus identification information that is identification information regarding an imaging apparatus itself, user identification information, and an imaging parameter that is a parameter for imaging.

In an imaging apparatus, an information processing method, and a program according to one aspect of the present technology, a captured image is associated with a hash value of signature metadata including imaging apparatus identification information that is identification information regarding the imaging apparatus and user identification information.

In an imaging apparatus, an information processing method, and a program according to another aspect of the present technology, imaging is controlled on the basis of license information that is information regarding a license and includes imaging apparatus identification information that is identification information regarding the imaging apparatus, user identification information, and an imaging parameter that is a parameter for imaging.

BRIEF DESCRIPTION OF DRAWINGS

FIG. 3 is a block diagram illustrating a main configuration example of a company terminal apparatus and the like.

FIG. 4 is a functional block diagram illustrating functions that are implemented in the company terminal apparatus and the like.

FIG. 8 is a flowchart illustrating an exemplary flow of activation processing.

FIG. 9 is a flowchart following FIG. 8, illustrating the exemplary flow of activation processing.

FIG. 10 is a flowchart illustrating an exemplary flow of activation processing.

FIG. 12 is a flowchart illustrating an exemplary flow of activation processing.

FIG. 14 is a flowchart illustrating an exemplary flow of activation processing.

FIG. 16 is a flowchart illustrating an exemplary flow of activation processing.

DESCRIPTION OF EMBODIMENT

Now, a mode for carrying out the present disclosure (hereinafter referred to as an "embodiment") is described. Note that the description is made in the following order.

1. Imaging Control
2. First Embodiment (Rental System)
3. Supplementary Note

1. Imaging Control

<Imaging Apparatus Rental Service>

For example, PTL 1 describes the method for digital cameras or the like, including converting a captured image or the like to a hash value and giving an electronic signature with the hash value to the captured image, to thereby detect alterations. The electronic signature can also include imaging apparatus information, for example.

Incidentally, in recent years, a service that rents imaging apparatuses to users has been considered. For example, there is a case where a business organization lends or rents cameras belonging to it to its employees or outsourcing destinations (outsourcing photographers or service users).

In such a service, it is desired that a business organization (company) that is an imaging apparatus provider can control information regarding electronic signatures to be given to captured images generated by a user, who is a stranger to the business organization (company), performing imaging by operating an imaging apparatus.

Further, it is desired that the business organization (company) can control terms of use of an imaging apparatus as follows, for example: the imaging apparatus can be used only by authorized users or the imaging apparatus can be used only in authorized places or dates and times. Moreover, it is desired that the business organization (company) can control imaging setting.

<Control of Imaging by Stranger>

Accordingly, it is intended to make it possible to control imaging by strangers. For example, imaging is controlled on the basis of license information that is information regarding a license and that includes imaging apparatus identification information that is identification information regarding an imaging apparatus, user identification information, and imaging parameters that are parameters for imaging. With this, imaging can be controlled by license information. License information is given to an imaging apparatus under the approval of an imaging apparatus provider. That is, an imaging apparatus provider can control imaging.

Figure 1:
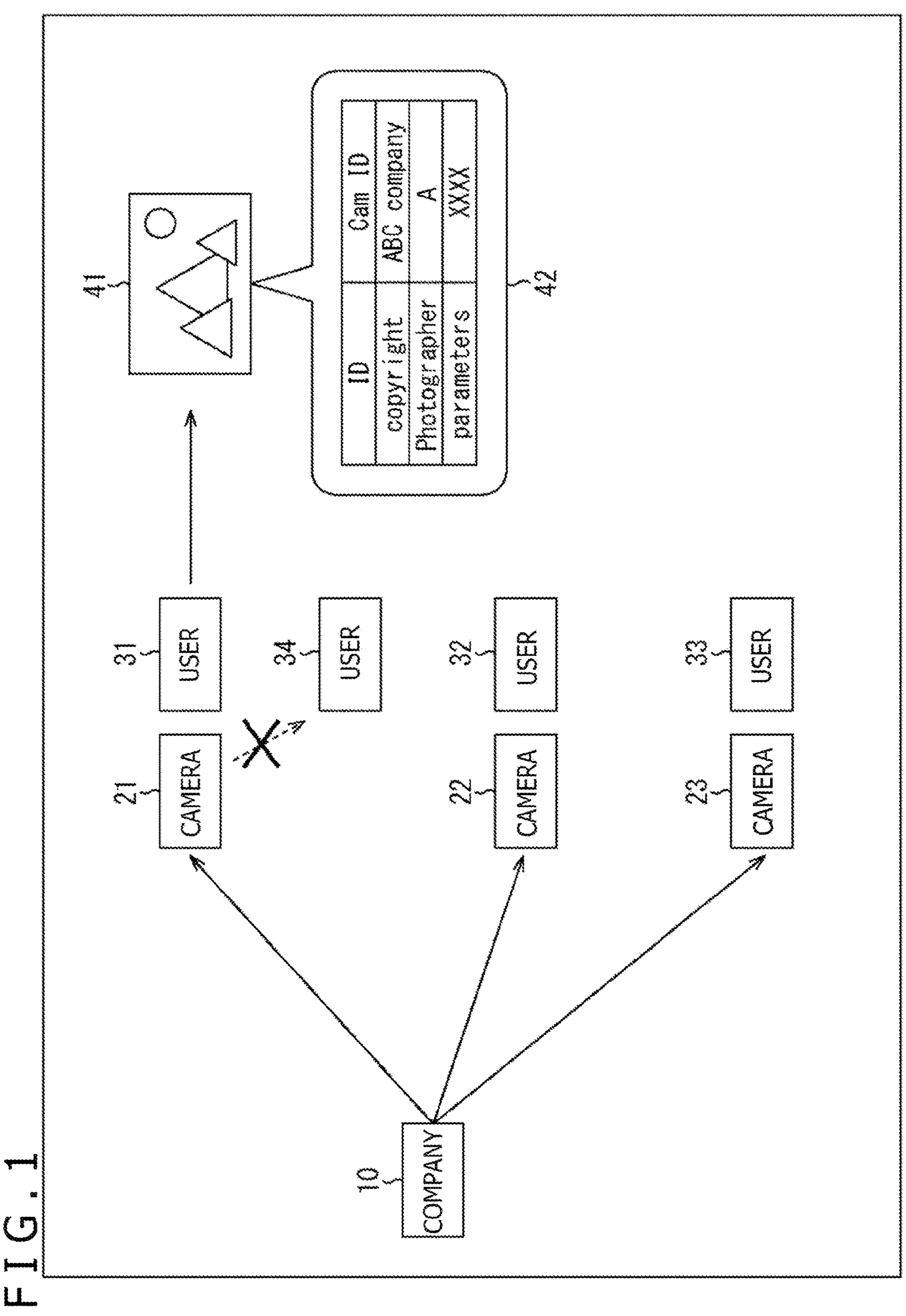
FIG. 1 is a diagram illustrating an outline of imaging control.

For example, as illustrated in FIG. 1, a company 10 rents a camera 21 to a user 31, rents a camera 22 to a user 32, and rents a camera 23 to a user 33. Further, the camera 21 has set therein license information approved by the provider of the camera 21. The license information at least includes identification information (ID) regarding the camera 21 itself and identification information (ID) regarding the user 31 who is a rental destination (legitimate user). Imaging can be controlled on the basis of those pieces of information to prevent anyone other than the legitimate user 31, who is indicated by the license information, from using the camera 21. For example, it is possible to prohibit an illegitimate user 34 from using the camera 21 (prevent the user 34 from using the camera 21). That is, a camera provider can control who uses a camera.

Imaging parameters included in license information may include information regarding the terms of use of an imaging apparatus, for example. With this, it is possible to allow a legitimate user to use an imaging apparatus (that is, perform imaging) only in a case where the terms of use are met.

The terms of use may be freely determined and relate to locations, times, or both of them, for example. For example, the use of an imaging apparatus is allowed only in a predetermined place, only at a predetermined date and time, or only at a predetermined date and time in a predetermined place. With this, a camera provider can limit dates and times or places in which the use of a camera is allowed.

Note that, here, dates and times are used as exemplary time conditions for allowing the use of a camera in the description, but any time information (that is, any information indicating a time range (period) in which the use of a camera is allowed) may be employed. For example, periods of time in which the use of a camera is allowed may be limited (that is, start time and end time may be indicated). Needless to say, only the start time may be indicated or only the end time may be indicated. Further, a time range in which the use of a camera is allowed may be indicated in any unit, such as years, half terms, quarter terms, months, weeks, days, odd months, even months, the beginning of months, the end of months, days of week, weekends, weekdays, national holidays, before noon, afternoon, morning, noon, night, hours, minutes, or seconds. For example, the use of a camera may be allowed only in designated months, only on designated days of week, or only on designated days (for example, days that end with the numeral 2) in every month.

Further, this similarly applies to locations (places), and any location information (that is, any information indicating the range of a region in which the use of a camera is allowed) may be employed. For example, a range may be indicated by GPS coordinates or the like, by administrative districts such as countries, prefectures, municipalities, or addresses, by postal codes, or by fixed-line area codes. Further, for example, a range may be indicated by the names of facilities or venues such as park names or play facility names. Moreover, for example, floors (basement floors, above-ground floors, N-th floor, or the like) may be designated.

Further, the terms of use may relate to subjects. For example, the use of a camera is allowed only in a case where a predetermined subject is imaged. With this, for example, subjects may be limited. That is, the purpose of imaging can be limited. Further, for example, it can be required that the merchandise of sponsors or the like always be arranged in the angle of field. With this, captured images can possess a value as an advertisement. Further, for example, it can be required that a predetermined building, a predetermined view, or the like be included in the background. With this, imaging places, times, or the like can be limited.

Further, imaging parameters included in license information may include imaging setting information that is information regarding imaging setting, for example. With this, for example, a camera provider can control the setting of a camera.

For example, information regarding imaging setting may include information regarding the resolution of captured images. That is, a resolution that is allowed with a license may be limited. In this case, a camera generates captured images at a resolution (or less) designated by license information. With this, a camera provider can control the resolution of captured images that are generated by a camera on the basis of license fees, user authority, or intended use, for example.

Further, for example, information regarding imaging setting may include information regarding the addition of credits to captured images. For example, information indicating whether or not to add credits to captured images generated by a camera and information designating the details of the credits to be added may be included as credit addition information. With this, a camera provider can control credits to be added to captured images generated by a camera.

Note that license information can include any information. For example, identification information (for example, company name) regarding a camera provider (company) may be included. Needless to say, information other than this may be included.

For example, license information may further include information indicating a license validity period. That is, imaging may be controlled by license information with a validity period. With this, for example, a period in which activation is allowed can be limited, or imaging setting available within or outside the period can be changed.

Further, for example, a hash value of signature metadata including imaging apparatus identification information that is identification information regarding an imaging apparatus and user identification information is associated with captured images. With this, an imaging apparatus provider can control signature metadata to be given to captured images generated by a user, who is a stranger, using an imaging apparatus. That is, an imaging apparatus provider can guarantee that an imaging apparatus that has generated captured images and the user thereof are authentic.

For example, in the case of FIG. 1, metadata 42 to be given to a captured image 41 generated by the user 31 performing imaging by using the camera 21 can include signature metadata such as the ID (Cam ID) of the camera 21 and the ID (A) of the user 31.

Further, for example, signature metadata may further include the company name of a company that provides imaging apparatuses to users. With this, the authenticity of an imaging apparatus provider (for example, owner of captured images) can be guaranteed.

Further, a hash value derived from signature metadata included in license information that is information regarding a license may be associated with captured images. That is, signature metadata included in license information may be associated with captured images. With this, an imaging apparatus provider can guarantee that an imaging apparatus that has generated captured images and the user thereof are authentic.

For example, the hash value of signature metadata and captured images may be associated with each other according to the details of a license. For example, this association may be performed only with a license with which captured images are protected. Further, this association may be performed only with respect to captured images taken under predetermined conditions designated by a license. Moreover, this association may be performed only with respect to captured images obtained by imaging a predetermined subject designated by a license. Various types of control are possible in this way.

Further, for example, the hash value of signature metadata and captured images may be associated with each other according to a validity period included in license information. For example, signature metadata (hash value thereof) may be associated with captured images generated within a validity period, or signature metadata (hash value thereof) may be associated with captured images generated outside the validity period. Various types of validity period-based control are possible in this way.

For example, an electronic signature including the hash value of signature metadata may be generated and the generated electronic signature may be associated with a captured image. That is, signature metadata may be included in the electronic signature of a captured image. With this, with use of electronic signature specifications, it can be guaranteed that an imaging apparatus that has generated captured images and the user thereof are authentic. For example, a captured image may be converted to a hash value, the hash value of the captured image and signature metadata may be converted to a hash value, and the hash value may be encrypted, to thereby generate an electronic signature. Then, the signature metadata may further be associated with the captured image associated with the electronic signature.

2. First Embodiment

<Rental System>

Figure 2:
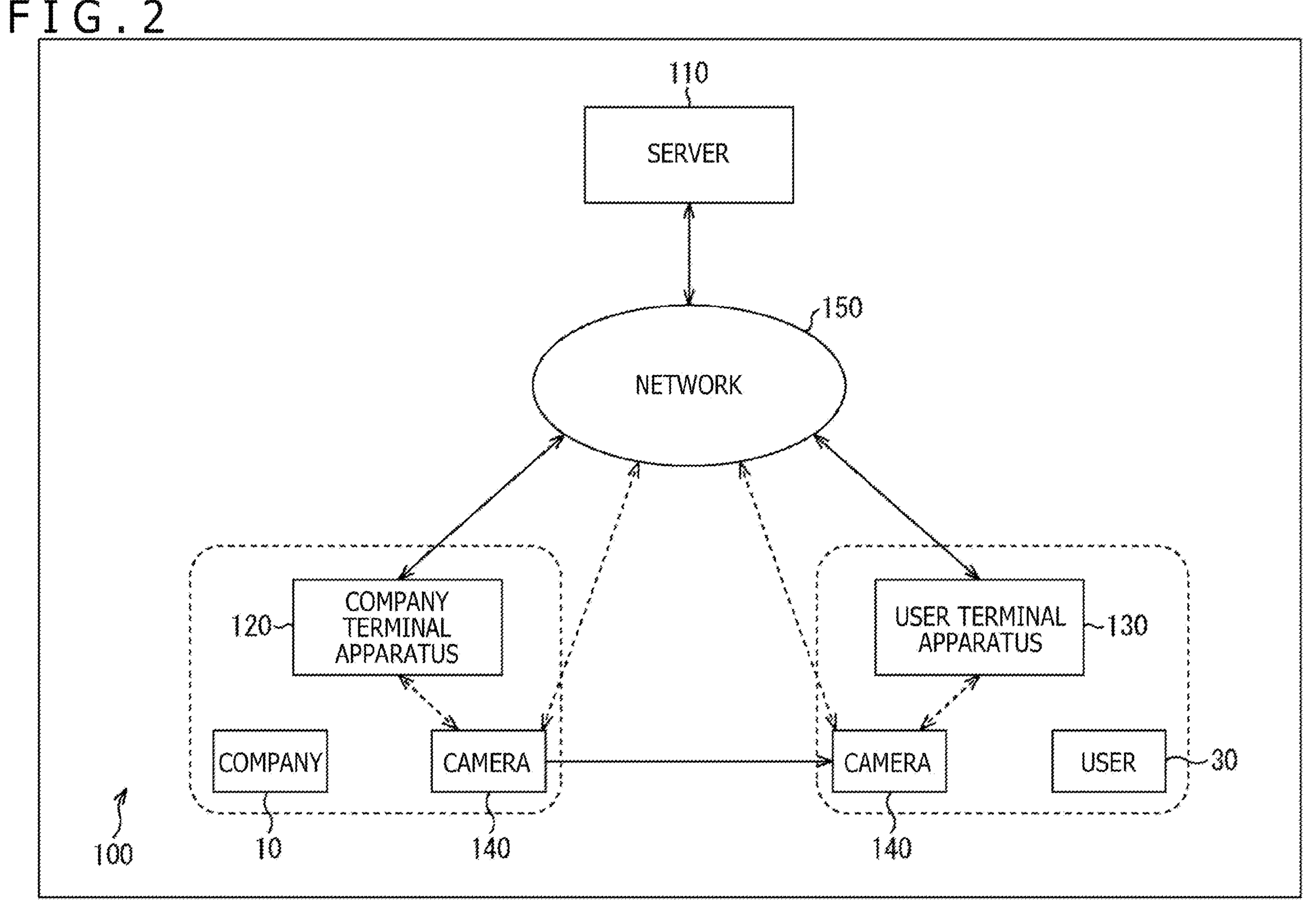
FIG. 2 is a diagram illustrating a main configuration example of a rental system.

FIG. 2 is a diagram illustrating a main configuration example of a rental system that is an embodiment of an information processing system to which the present technology is applied. A rental system 100 illustrated in FIG. 2 is a system configured to manage the rental of a camera 140 from the company 10 to a user 30.

The company 10 is the provider of the camera 140 in the rental system 100. The company 10 may or may not be the owner of the camera 140. For example, the company 10 may provide the camera 140 owned by another company.

The user 30 is a user who uses the camera 140 rented from the company 10. That is, the user 30 images a subject by using the camera 140 to generate captured images.

For example, the user 30 may be an employee of the company 10. In this case, the user 30 who is an employee performs imaging by using the shared camera 140 owned by the company 10 to generate captured images. For example, there is a case where a journalist who works at a newspaper company collects news (performs imaging) by using a camera owned by the newspaper company. The rental system 100 may manage which camera 140 is to be rented to which employee in such a company. Further, in this case, it is possible that the company 10 has the rights of captured images generated by the camera 140. The rental system 100 can also manage such captured images.

Further, for example, the user 30 may be a person to which the company 10 outsources tasks. For example, there is a case where the user 30 is a freelance photographer who has accepted an imaging job offer from a newspaper company. The rental system 100 may manage such a rental agreement between the company 10 and a party outside the company 10. Further, in this case, it is possible that captured images generated by the camera 140 are delivered to the company 10. The rental system 100 can also manage such captured images.

Moreover, for example, the user 30 may be a user of a service for renting the camera 140 provided by the company 10. For example, there is a case where the company 10 provides a service for renting the camera 140 and the user 30 rents the camera 140 by using the service and performs imaging by using the rented camera 140. The rental service may be a paid or free service. For example, the camera 140 may be rented at no charge and captured images generated by using the camera 140 may be provided with charge. The rental system 100 may manage which camera 140 is to be rented to which user in such a service. Further, in this case, it is possible that captured images generated by the camera 140 may be printed or distributed to be provided to the user 30. In such a case, the company 10 preferably has the rights of the captured images. The rental system 100 can also manage such captured images.

As illustrated in FIG. 2, the rental system 100 includes a server 110, a company terminal apparatus 120, a user terminal apparatus 130, and the camera 140. The apparatuses are connected to each other via a network 150 for communication. However, the camera 140 may not be connected to the network 150 (may be offline). Further, the camera 140 may be connected, for communication, to the network 150 through another apparatus such as the company terminal apparatus 120 or the user terminal apparatus 130.

The server 110 performs processing for the management of a license agreement between the company 10 and the user 30 in terms of the rental of the camera 140. For example, the server 110 performs processing for license information generation, the activation of the user 30, and the like.

The company terminal apparatus 120 is a terminal apparatus owned by the company 10 and performs processing for the setting of the license of the camera 140 to be rented. The user terminal apparatus 130 is a terminal apparatus owned by the user 30 and performs processing for the registration of information regarding the user 30.

The camera 140 is an imaging apparatus to be rented and performs processing such as the activation of the user 30, imaging control, and captured image generation.

Note that, in FIG. 2, the server 110, the company 10 (company terminal apparatus 120), the user 30 (user terminal apparatus 130), and the camera 140 are each illustrated as a single component, but in the rental system 100, the number of each component is freely determined and may be one or more. Further, the network 150 may include multiple networks.

<Server>

Figure 3:
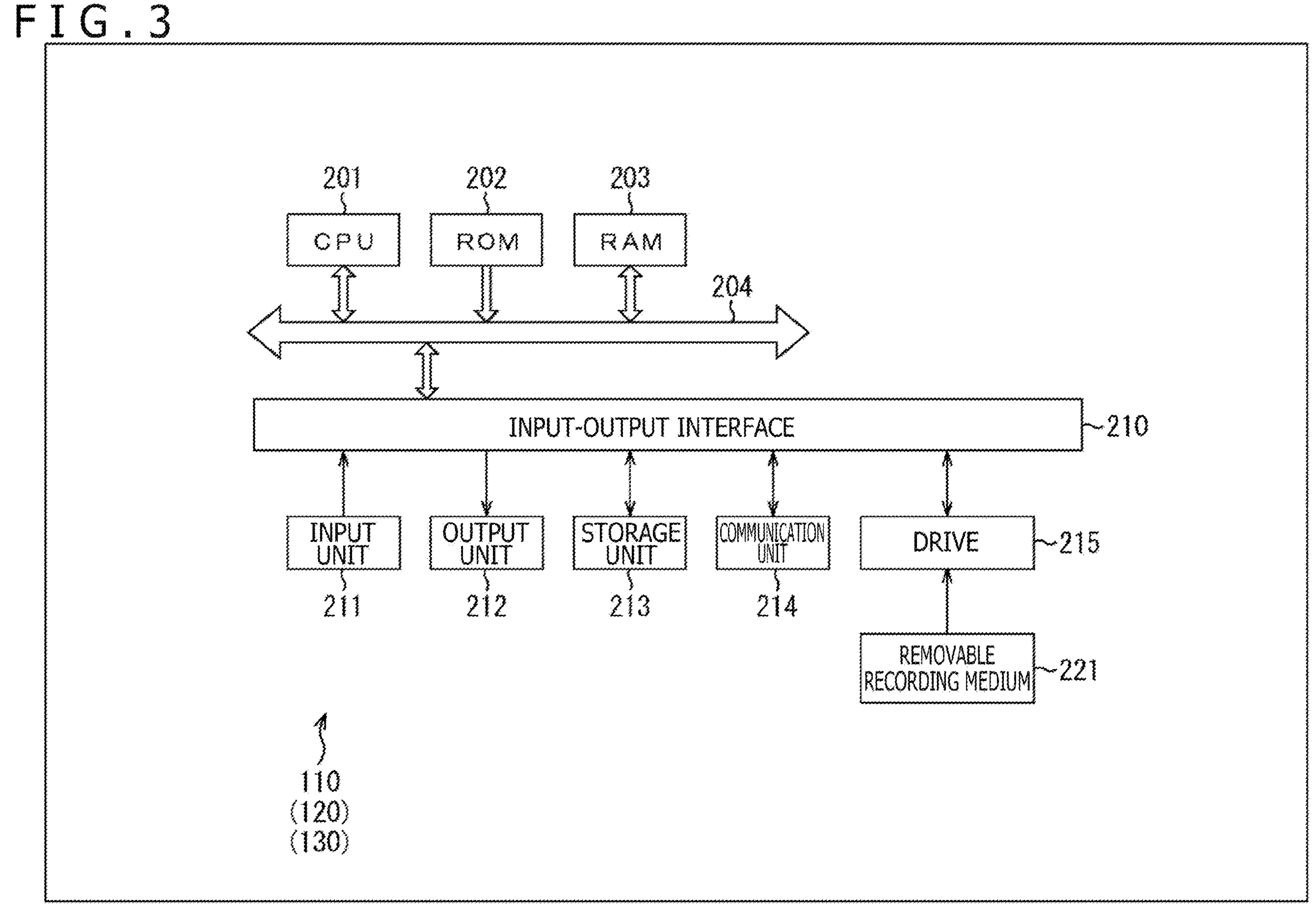

FIG. 3 is a diagram illustrating a main configuration example of the server 110 that is an embodiment of an information processing apparatus to which the present technology is applied. The server 110 illustrated in FIG. 3 is a computer configured to install an application program (software) for performing processing for the management of the rental of the camera 140 and execute the application program. Here, examples of the computer include computers incorporated in dedicated hardware or general-purpose personal computers capable of executing various functions with various programs installed thereon. The server 110 executes the application program to perform the processing for the rental of the camera 140.

In the server 110 illustrated in FIG. 3, a CPU (Central Processing Unit) 201, a ROM (Read Only Memory) 202, and a RAM (Random Access Memory) 203 are connected to each other through a bus 204.

The bus 204 is also connected to an input-output interface 210. The input-output interface 210 is connected to an input unit 211, an output unit 212, a storage unit 213, a communication unit 214, and a drive 215.

The input unit 211 includes, for example, a keyboard, a mouse, a microphone, a touch panel, an input terminal, or the like. The output unit 212 includes, for example, a display, a speaker, an output terminal, or the like. The storage unit 213 includes, for example, a hard disk, a RAM disk, a non-volatile memory, or the like. The communication unit 214 includes a network interface, for example. The drive 215 drives a removable recording medium 221 such as a magnetic disk, an optical disk, a magneto-optical disk, or a semiconductor memory.

In the server 110 configured as described above, the series of processing processes described above is performed by the CPU 201 loading the application program stored in the storage unit 213 on the RAM 203 through the input-output interface 210 and the bus 204 to execute the application program, for example. In the RAM 203, for example, data necessary for the CPU 201 to execute various types of processing is also stored as appropriate.

The application program that the server 110 executes can be recorded on the removable recording medium 221, which is a package medium or the like, to be applied, for example. In this case, the application program can be installed on the storage unit 213 through the input-output interface 210 with the removable recording medium 221 mounted on the drive 215.

Further, the application program can also be provided through a wired or wireless transmission medium such as a local area network, the Internet, or digital satellite broadcasting. In this case, the application program can be received by the communication unit 214 to be installed on the storage unit 213.

Besides, the application program can also be installed on the ROM 202 or the storage unit 213 in advance.

Note that the configuration of the server 110 is freely determined and not limited to the example of FIG. 3. For example, the server 110 may be implemented as cloud computing in which multiple apparatuses share processing in cooperation with each other via a network. That is, the server 110 (cloud server) may perform the processing for the management of the rental of the camera 140 or provide a service, as a cloud service.

Further, the company terminal apparatus 120 and the user terminal apparatus 130 also have configurations similar to that of the server 110 illustrated in FIG. 3. That is, the block diagram of FIG. 3 can be used to describe the company terminal apparatus 120 and the user terminal apparatus 130.

Functions that are implemented by the company terminal apparatus 120 executing the application program are illustrated as functional blocks in A of FIG. 4. As illustrated in A of FIG. 4, the company terminal apparatus 120 executes the application program, thereby being capable of achieving the functional blocks such as an apparatus-specific information registration request unit 301, a linking request processing unit 302, a validity period setting request unit 303, an imaging parameter request unit 304, and a license key recording unit 305.

The apparatus-specific information registration request unit 301 performs processing for the request of the registration of apparatus-specific information that is information unique to the camera 140. For example, the apparatus-specific information registration request unit 301 performs processing for the request of the registration of an apparatus-specific ID that is identification information unique to the camera 140. That is, an apparatus-specific ID is imaging apparatus identification information that is identification information regarding an imaging apparatus.

The linking request processing unit 302 performs processing for the request of linking between the apparatus-specific ID of the camera 140 to be rented and a user ID that is identification information regarding the user 30 who is a rental destination of the camera 140. That is, the linking request processing unit 302 performs license construction processing.

The validity period setting request unit 303 performs processing for the request of validity period setting. The imaging parameter request unit 304 performs processing for the request of imaging parameters. The license key recording unit 305 performs processing for the recording of license keys.

A function that is implemented by the user terminal apparatus 130 executing the application program is illustrated as a functional block in B of FIG. 4. As illustrated in B of FIG. 4, the user terminal apparatus 130 executes the application program, thereby being capable of achieving the functional block such as a user registration request unit 311. The user registration request unit 311 performs processing for the request of user registration.

Functions that are implemented by the server 110 executing the application program are illustrated as functional blocks in C of FIG. 4. As illustrated in C of FIG. 4, the server 110 executes the application program, thereby being capable of achieving the functional blocks such as a user registration unit 321, an apparatus-specific information registration unit 322, a signature metainformation generation unit 323, a login processing unit 324, a validity period setting unit 325, an imaging parameter generation unit 326, a user confirmation unit 327, and a license key issuing unit 328.

The user registration unit 321 performs processing for the registration of user information regarding the user 30 who is a rental destination. The apparatus-specific information registration unit 322 performs processing for the registration of apparatus-specific information regarding the camera 140 to be rented. The signature metainformation generation unit 323 performs processing for the generation of signature metainformation that is used for electronic signature generation. The login processing unit 324 performs processing for the login of the user 30 who is a rental destination. The validity period setting unit 325 performs processing for the setting of license validity periods. The imaging parameter generation unit 326 performs processing for the generation of imaging parameters. The user confirmation unit 327 performs processing for user confirmation in login processing or the like. The license key issuing unit 328 performs processing for the issuing of a license key that is exemplary license information.

<License Key>

Figure 5:
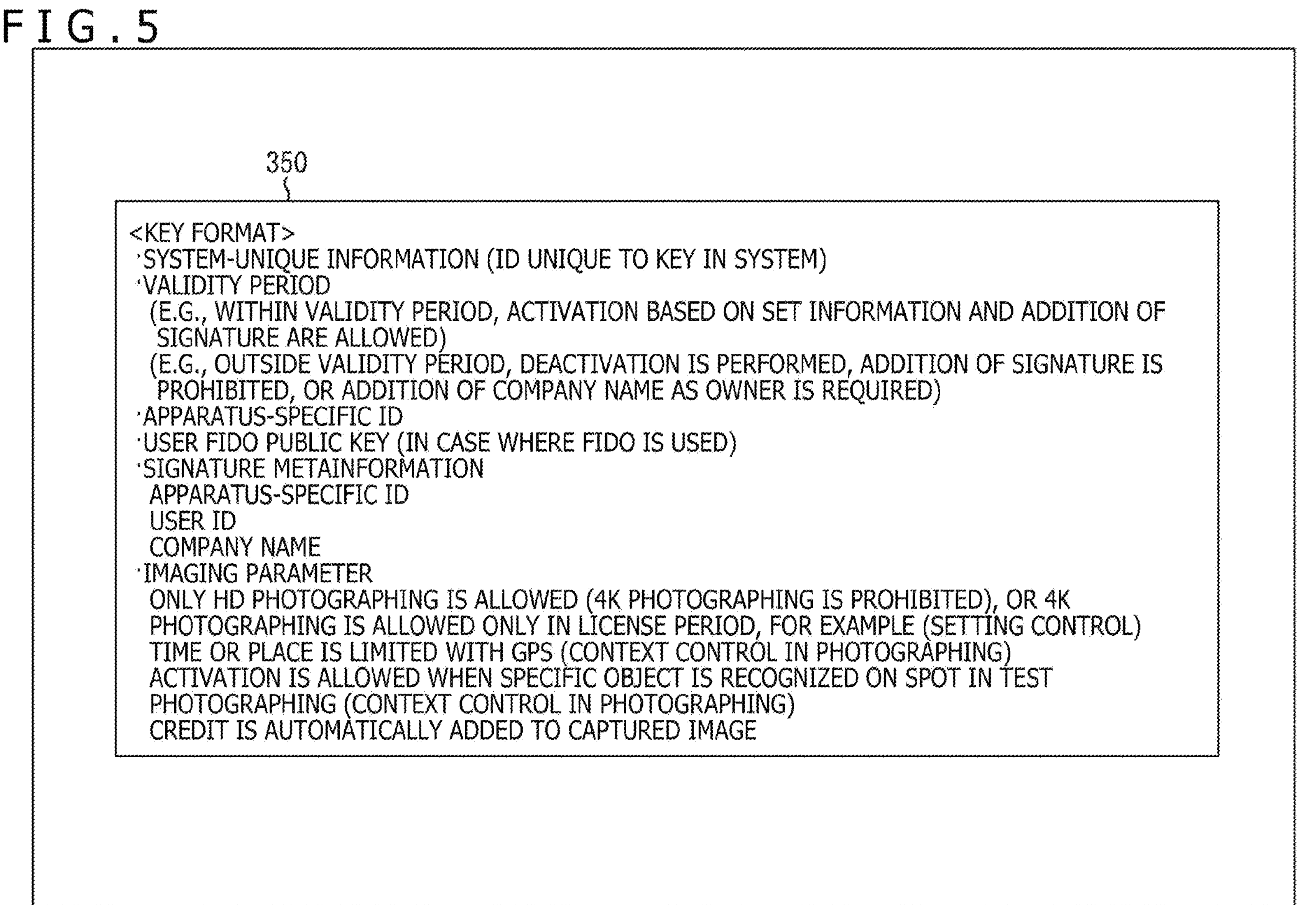
FIG. 5 is a diagram illustrating an exemplary license key.

An exemplary license key is illustrated in FIG. 5. As illustrated in FIG. 5, a license key 350 that is issued in the server 110 includes system-unique information that is identification information (ID) unique to a key in the system, for example.

Further, the license key 350 may include information regarding a validity period that is used for imaging control. For example, within the validity period described here, the activation of the user 30 in the camera 140 may be allowed. Further, the addition of electronic signatures to captured images may be allowed. In contrast, the addition of electronic signatures to captured images may be prohibited. Further, for example, outside the validity period described here, the activation of the user 30 in the camera 140 may be rejected (deactivation). Further, the addition of electronic signatures to captured images may be allowed. In contrast, the addition of electronic signatures to captured images may be prohibited.

Moreover, the license key 350 may include an apparatus-specific ID. Further, the license key 350 may include a user FIDO (Fast IDentity Online) public key.

Further, the license key 350 includes signature metainformation including the apparatus-specific ID of the camera 140 and the user ID of the user 30. Moreover, signature metainformation may include information regarding the company 10 (for example, company name), which is the provider of the camera 140.

Moreover, the license key 350 may include imaging parameters that are parameters for imaging. Imaging parameters may be any information regarding imaging. For example, imaging parameters may include information regarding imaging setting. For example, imaging parameters may include information regarding the resolution of captured images as the information regarding imaging setting. For example, imaging parameters may include control information that allows the generation of HD captured images and prohibits the generation of 4K captured images. Further, imaging parameters may include control information that allows the generation of 4K captured images only in a license period.

Further, for example, imaging parameters may include information regarding context control in imaging (terms of use information). For example, imaging parameters may include, as the information regarding context control in imaging, control information that limits periods of time or places (locations or times) in which imaging is allowed. Further, for example, imaging parameters may include, as the information regarding context control in imaging, control information that allows imaging (or activation) only in a case where there is a predetermined subject.

Moreover, for example, imaging parameters may include control information regarding captured image generation. For example, imaging parameters may include, as the control information regarding captured image generation, control information regarding the addition of credits to captured images.

<Camera>

Figure 6:
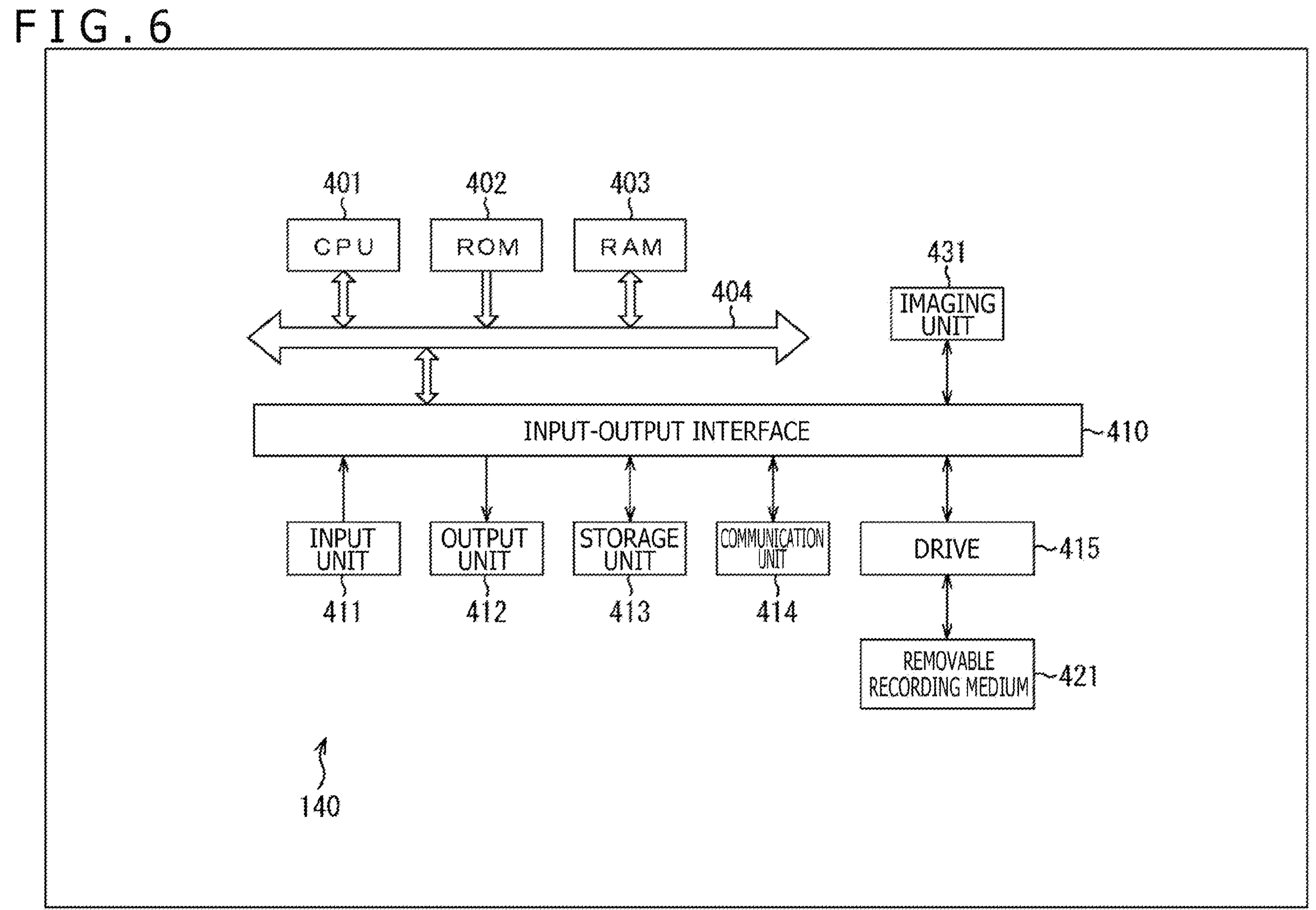
FIG. 6 is a block diagram illustrating a main configuration example of a camera.

FIG. 6 is a diagram illustrating a main configuration example of the camera 140 that is an embodiment of an imaging apparatus to which the present technology is applied. The camera 140 illustrated in FIG. 6 is a computer configured to install an application program (software) for performing processing for the rental of the camera 140 or imaging processing and execute the application program. Here, examples of the computer include computers incorporated in dedicated hardware or general-purpose personal computers capable of executing various functions with various programs installed thereon. The camera 140 executes the application program to perform the processing for the rental of the camera 140 or the imaging processing.

In the camera 140 illustrated in FIG. 6, a CPU 401, a ROM 402, and a RAM 403 are connected to each other through a bus 404.

The bus 404 is also connected to an input-output interface 410. The input-output interface 410 is connected to an input unit 411, an output unit 412, a storage unit 413, a communication unit 414, and a drive 415.

The input unit 411 includes, for example, a keyboard, a mouse, a microphone, a touch panel, an input terminal, or the like. The output unit 412 includes, for example, a display, a speaker, an output terminal, or the like. The storage unit 413 includes, for example, a hard disk, a RAM disk, a non-volatile memory, or the like. The communication unit 414 includes a network interface, for example. The drive 415 drives a removable recording medium 421 such as a magnetic disk, an optical disk, a magneto-optical disk, or a semiconductor memory.

Moreover, the input-output interface 410 is connected to an imaging unit 431. The imaging unit 431 includes an optical system including a lens and an aperture, for example, and an image sensor and images a subject to generate captured images. Note that the imaging unit 431 may further include components other than those described above, such as an image processing unit configured to perform image processing on generated captured images or a memory configured to store data of captured images.

In the camera 140 configured as described above, the series of processing processes described above is performed by the CPU 401 loading the application program stored in the storage unit 413 on the RAM 403 through the input-output interface 410 and the bus 404 to execute the application program, for example. In the RAM 403, for example, data necessary for the CPU 401 to execute various types of processing is also stored as appropriate.

The application program that the camera 140 executes can be recorded on the removable recording medium 421, which is a package medium or the like, to be applied, for example. In this case, the application program can be installed on the storage unit 413 through the input-output interface 410 with the removable recording medium 421 mounted on the drive 415.

Further, the application program can be provided through a wired or wireless transmission medium such as a local area network, the Internet, or digital satellite broadcasting. In this case, the application program can be received by the communication unit 414 to be installed on the storage unit 413.

Besides, the application program can be installed on the ROM 402 or the storage unit 413 in advance.

Figure 7:
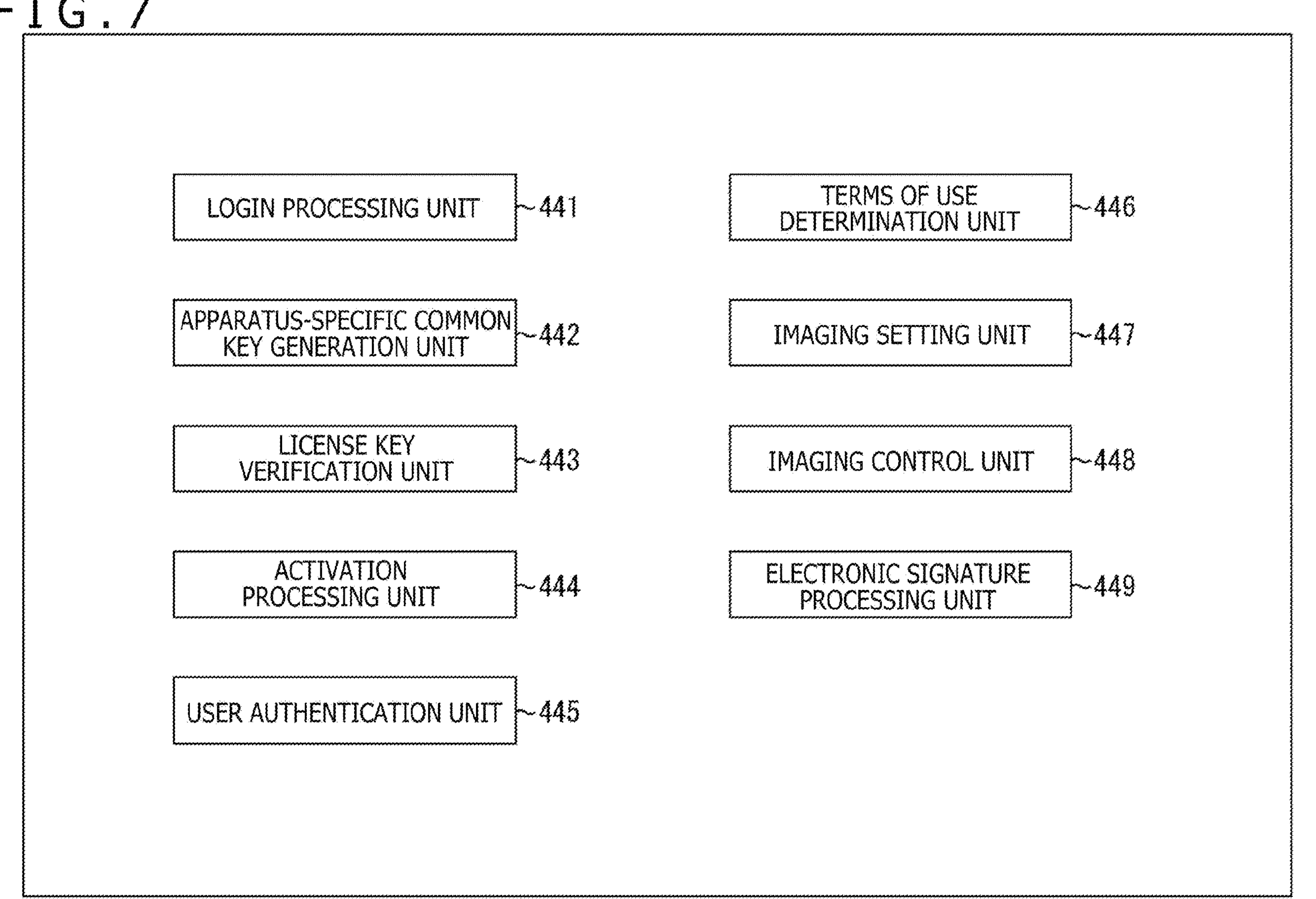
FIG. 7 is a functional block diagram illustrating functions that are implemented in the camera.

Functions that are implemented by the camera 140 executing the application program are illustrated as functional blocks in FIG. 7. As illustrated in FIG. 7, the camera 140 executes the application program, thereby being capable of achieving the functional blocks such as a login processing unit 441, an apparatus-specific common key generation unit 442, a license key verification unit 443, an activation processing unit 444, a user authentication unit 445, a terms of use determination unit 446, an imaging setting unit 447, an imaging control unit 448, and an electronic signature processing unit 449.

The login processing unit 441 performs login processing. The apparatus-specific common key generation unit 442 performs processing for the generation of apparatus-specific common keys. The license key verification unit 443 performs processing for the verification of license keys supplied from the server 110. The activation processing unit 444 performs offline activation processing. The user authentication unit 445 performs user authentication processing. The terms of use determination unit 446 performs processing for the determination of terms of use based on license information. The imaging setting unit 447 performs processing for imaging setting based on license information. The imaging control unit 448 performs imaging control processing. The electronic signature processing unit 449 performs processing for electronic signatures to be associated with captured images.

<Flow of Online Processing 1>

Next, an exemplary flow of activation processing that is executed by the rental system 100 as described above is described with reference to the flowcharts of FIG. 8 and FIG. 9. The activation processing in this case is performed with the camera 140 being online (being capable of communicating with the server 110).

First, processing for registering user IDs and apparatus-specific IDs on the server 110 is performed. The user registration request unit 311 of the user terminal apparatus 130 requests the server 110 to register a user in Step S111 of FIG. 8. For example, the user registration request unit 311 supplies the server 110 with user information that is information regarding a user through the communication unit 214 of the user terminal apparatus 130. The user registration unit 321 of the server 110 acquires the user information through the communication unit 214 of the server 110 in Step S121, and generates a user ID corresponding to the user information and registers the user ID on a database in Step S122. The user registration unit 321 of the server 110 supplies the user terminal apparatus 130 with the registered user ID through the communication unit 214 of the server 110 in Step S123. The user registration request unit 311 of the user terminal apparatus 130 acquires the user ID through the communication unit 214 of the user terminal apparatus 130 in Step S112 and stores the user ID in the storage unit 213 of the user terminal apparatus 130, for example.

Further, the apparatus-specific information registration request unit 301 of the company terminal apparatus 120 requests the server 110 to register an apparatus-specific ID in Step S101. For example, the apparatus-specific information registration request unit 301 supplies the server 110 with the apparatus-specific ID of the camera 140 to be rented through the communication unit 214 of the company terminal apparatus 120. The apparatus-specific information registration unit 322 of the server 110 acquires the apparatus-specific ID through the communication unit 214 of the server 110 in Step S124 and registers the apparatus-specific ID on the database in Step S125.

Note that the user registration processing and the apparatus-specific ID registration processing can be performed independently of each other, and which one is performed first does not matter. Further, these processing processes can also be performed in parallel.

After the user 30 (user ID thereof) and the apparatus-specific ID of the camera 140 are registered on the server 110, processing for the generation of signature metainformation corresponding to a license is performed. Note that this processing can be performed at any timing after the registration of the user (user ID) and the apparatus-specific ID. In other words, the user ID and the apparatus-specific ID already registered on the server 110 can be linked to each other at any timing.

Note that, herein, pieces of data are "linked" to each other means that pieces of data are "associated" with each other. Here, the term "associate" means, for example, that one piece of data may be processed by using (linking) another piece of data. That is, pieces of data associated with each other may be integrated as one piece of data or provided as separate pieces of data. For example, multiple pieces of information associated with each other may be transmitted on transmission lines different from each other. Further, for example, multiple pieces of information associated with each other may be recorded on recording media different from each other (or different recording areas in the same recording medium). Note that pieces of data may be "associated" with each other in part, rather than entirely. For example, an image and information corresponding to the image may be associated with each other in any unit, such as multiple frames, a single frame, or a part of a frame.

Note that, herein, other than "link" described above, the terms such as "combine," "multiplex," "add," "integrate," "include," "store," "put in," "place into," and "insert" each mean grouping multiple things together and mean one of the ways of "associate" described above.

In Step S102 of FIG. 8, the linking request processing unit 302 of the company terminal apparatus 120 requests, through the communication unit 214 of the company terminal apparatus 120, linking between the apparatus-specific ID of the camera 140 to be rented and the user ID of the user 30 who is a rental destination of the camera 140.

The signature metainformation generation unit 323 of the server 110 generates signature metainformation including the designated user ID and apparatus-specific ID on the basis of the request and registers the signature metainformation on the database in Step S126. The signature metainformation is information that can be included in an electronic signature and includes an apparatus-specific ID indicating a device that has generated a captured image to which the electronic signature is to be added and a user ID indicating a user who has operated the device. That is, with the signature metainformation, the user ID and the apparatus-specific ID are linked to each other.

Further, the signature metainformation may further include a company name (or identification information) indicating a company that is a provider which has provided the user with the device. That is, with signature metainformation, a company name may further be linked to a user ID and an apparatus-specific ID. Note that a company name may indicate the right holder of captured images. Moreover, signature metainformation may include other information. In the following, signature metainformation includes an apparatus-specific ID, a user ID, and a company name. That is, the signature metainformation generation unit 323 generates signature metainformation including the designated user ID and apparatus-specific ID and the company name of the company 10 and registers the signature metainformation on the database.

After those pieces of information are registered, the camera 140 is rented to the user 30 according to the license (that is, signature metainformation generated in Step S126). That is, the camera 140 having the apparatus-specific ID included in the signature metainformation is rented from the company 10 to the user 30 corresponding to the user ID included in the same signature metainformation.

After the camera 140 is rented, the activation processing of FIG. 9 is performed. That is, the user 30 to whom the camera 140 has been rented performs a procedure for activating himself/herself, thereby making the camera 140 ready. In this case, the activation processing is performed online as described above. That is, the user 30 operates the rented camera 140 to communicate with the server 110 and perform activation.

The login processing unit 441 of the camera 140 operated by the user 30 transmits login information, the apparatus-specific ID, and the like to the server 110 through the communication unit 414 to request a login in Step S131 of FIG. 9. Login information includes information regarding login such as a user ID and a password.

The login processing unit 324 of the server 110 acquires the request through the communication unit 214 and accepts the login when the user is legitimate (user ID and password are correct) in Step S141. In Step S142, the login processing unit 324 confirms linking between the login user and the apparatus. That is, the login processing unit 324 confirms the registered signature metainformation and confirms whether there is signature metainformation linking the user ID and apparatus-specific ID supplied from the camera 140 to each other. That is, the login processing unit 324 confirms linking between the login user and the apparatus-specific ID.

In a case where there is such signature information, that is, in a case where linking between the login user and the camera 140 is confirmed, the login processing unit 324 supplies the camera 140 with license information regarding the license corresponding to the user ID and the apparatus-specific ID through the communication unit 214. That is, the login processing unit 324 transmits the license information including the signature metainformation linking the user ID and apparatus-specific ID supplied from the camera 140 to each other and the user ID to the camera 140. Note that license information may include other information.

The login processing unit 441 of the camera 140 acquires the license information through the communication unit 414 in Step S132 and performs activation in Step S133.

Through the processing executed as described above, online activation can be performed.

<Flow of Online Processing 2>

Figure 11:
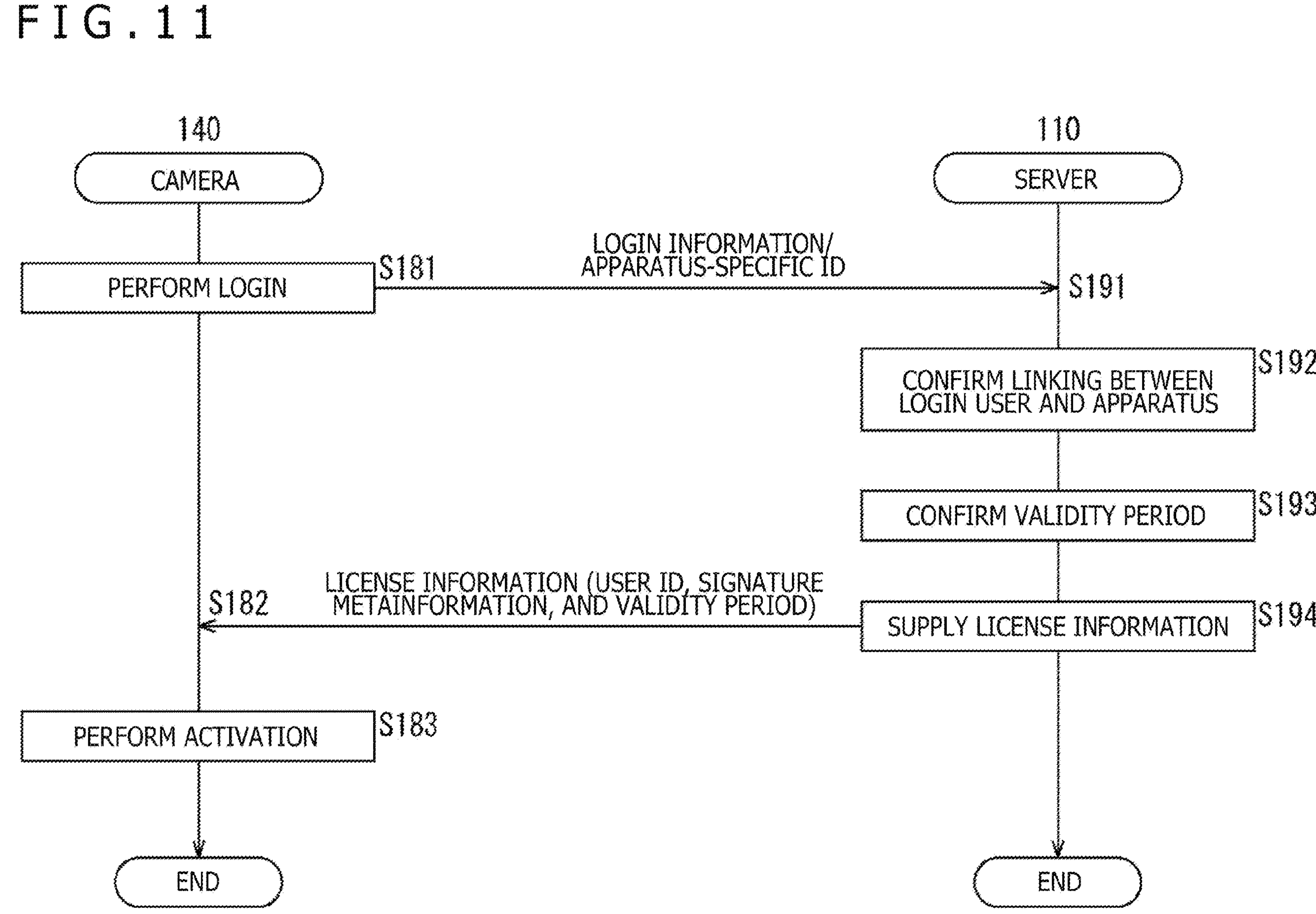
FIG. 11 is a flowchart following FIG. 10, illustrating the exemplary flow of activation processing.

As described above, license information may include information other than signature metainformation and user IDs. For example, license validity period information may be included. An exemplary flow of activation processing in this case is described with reference to the flowcharts of FIG. 10 and FIG. 11. The activation processing in this case is performed with the camera 140 being online (being capable of communicating with the server 110) as in the case of FIG. 8 and FIG. 9.

Processing up to the signature metainformation generation is executed as in the case of FIG. 8. That is, the processing in Step S151 and Step S152 (FIG. 10) that is executed by the company terminal apparatus 120 is executed similarly to the processing in Step S101 and Step S102 (FIG. 8) described above. Further, the processing in Step S161 and Step S162 (FIG. 10) that is executed by the user terminal apparatus 130 is executed similarly to the processing in Step S111 and Step S112 (FIG. 8) described above. Moreover, the processing in Step S171 to Step S176 (FIG. 10) that is executed by the server 110 is executed similarly to the processing in Step S121 to Step S126 (FIG. 8) described above.

After the signature metainformation is generated, the validity period setting request unit 303 of the company terminal apparatus 120 supplies the server 110 with validity period information through the communication unit 214 of the company terminal apparatus 120 to request validity period setting in Step S153. The validity period setting unit 325 of the server 110 acquires the request (validity period information) through the communication unit 214 of the server 110 and sets the validity period of the license on the basis of the request (validity period information) in Step S177. That is, the validity period setting unit 325 sets the validity period of the license to the validity period designated by the validity period information supplied from the company terminal apparatus 120 and registers the validity period on the database.

Activation processing that is executed after the camera 140 is rented is performed along a flow similar to that in the case of FIG. 9 basically. That is, the processing in Step S181 to Step S183 (FIG. 11) that is executed by the camera 140 is executed similarly to the processing in Step S131 to Step S133 (FIG. 9) described above. Further, the processing in Step S191, Step S192, and Step 3194 that is executed by the server 110 is executed similarly to the processing in Step S141 to Step S143 (FIG. 9) described above.

However, when linking between the login user and the camera 140 is confirmed, that is, when linking between the user ID of the login user and the apparatus-specific ID (signature metainformation) is confirmed in Step S192, the login processing unit 324 of the server 110 confirms the validity period of the license in Step S193. Then, in a case where it is within the validity period at that point in time, the login processing unit 441 generates license information and transmits the license information to the camera 140 in Step S194. The license information includes the user ID, the signature metainformation, the validity period, and the like. The login processing unit 441 of the camera 140 acquires the license information in Step 3182. Then, the login processing unit 441 performs activation on the basis of the license information in Step S183.

Through the processing executed as described above, setting regarding validity periods can also be performed.

<Flow of Online Processing 3>

Figure 13:
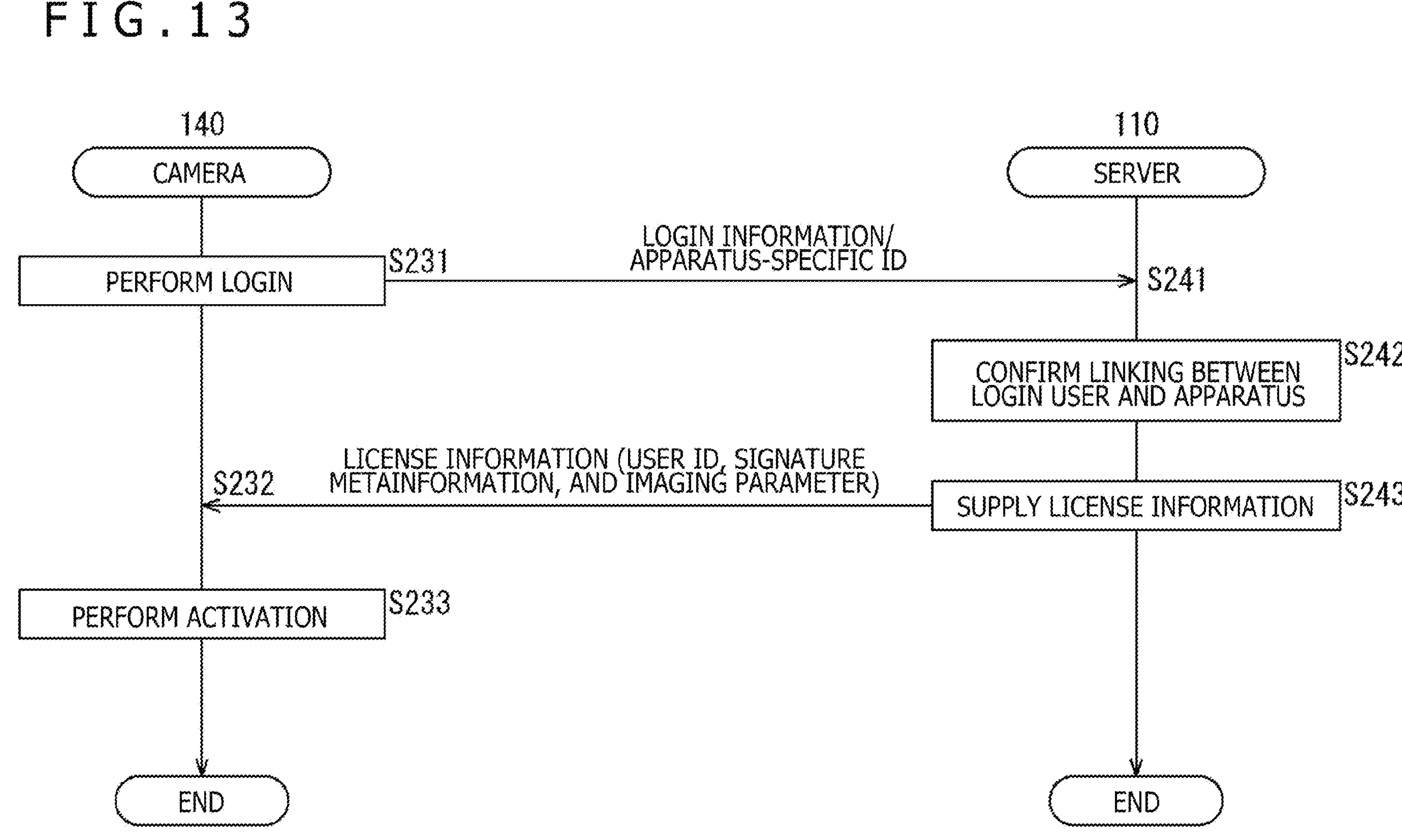
FIG. 13 is a flowchart following FIG. 13, illustrating the exemplary flow of activation processing.

As described above, license information may include information other than signature metainformation and user IDs. For example, imaging parameter information may be included. An exemplary flow of activation processing in this case is described with reference to the flowcharts of FIG. 12 and FIG. 13. The activation processing in this case is performed with the camera 140 being online (being capable of communicating with the server 110) as in the case of FIG. 8 and FIG. 9.

Processing up to the signature metainformation generation is executed as in the case of FIG. 8. That is, the processing in Step S201 and Step S202 (FIG. 12) that is executed by the company terminal apparatus 120 is executed similarly to the processing in Step S101 and Step S102 (FIG. 8) described above. Further, the processing in Step S211 and Step S212 (FIG. 12) that is executed by the user terminal apparatus 130 is executed similarly to the processing in Step S111 and Step S112 (FIG. 8) described above. Moreover, the processing in Step S221 to Step S226 (FIG. 12) that is executed by the server 110 is executed similarly to the processing in Step S121 to Step S126 (FIG. 8) described above.

After the signature metainformation is generated, the imaging parameter request unit 304 of the company terminal apparatus 120 accesses the server 110 through the communication unit 214 of the company terminal apparatus 120 to request imaging parameter setting in Step S203. The imaging parameter generation unit 326 of the server 110 generates imaging parameters on the basis of the request and registers the imaging parameters on the database in Step S227.

Activation processing that is executed after the camera 140 is rented is performed along a flow similar to that in the case of FIG. 9 basically. That is, the processing in Step S231 to Step S233 (FIG. 13) that is executed by the camera 140 is executed similarly to the processing in Step S131 to Step S133 (FIG. 9) described above. Further, the processing in Step S241 to Step S243 that is executed by the server 110 is executed similarly to the processing in Step S141 to Step S143 (FIG. 9) described above.

Note that the license information that is supplied from the server 110 to the camera 140 (Step S243 or Step S232) includes the imaging parameters generated as described above in addition to the user ID and the signature metainformation.

Through the processing executed as described above, imaging parameters can also be generated.

<Flow of Offline Processing 1>

Next, an exemplary flow of activation processing that is performed with the camera 140 being offline (being incapable of communicating with the server 110) is described with reference to the flowcharts of FIG. 14 and FIG. 15. Note that, here, a case where license information includes neither validity period information nor imaging parameters is described as an example. That is, the example of FIG. 14 and FIG. 15 corresponds to the example of FIG. 8 and FIG. 9.

First, processing for registering user IDs and apparatus-specific IDs on the server 110 is performed. The user registration request unit 311 of the user terminal apparatus 130 requests the server 110 to register a user in Step S271 of FIG. 14. For example, the user registration request unit 311 supplies the server 110 with user information that is information regarding a user through the communication unit 214 of the user terminal apparatus 130 to request the registration of the user information. The user registration unit 321 of the server 110 acquires the user information through the communication unit 214 of the server 110 in Step S281, and generates a user ID corresponding to the user information and registers the user ID on the database in Step S282.

Further, the apparatus-specific common key generation unit 442 of the camera 140 generates an apparatus-specific common key in Step S251. In Step S252, the apparatus-specific common key generation unit 442 supplies the company terminal apparatus 120 with apparatus-specific information that includes the generated apparatus-specific common key and is information unique to the apparatus. For example, the apparatus-specific common key generation unit 442 supplies the company terminal apparatus 120 with an apparatus-specific ID, an apparatus-specific common key encrypted with a public key of the server 110, and the hash value of the apparatus-specific ID and the apparatus-specific common key derived by using the apparatus-specific common key, as apparatus-specific information.

The apparatus-specific information registration request unit 301 of the company terminal apparatus 120 acquires the apparatus-specific information through the communication unit 214 of the company terminal apparatus 120 in Step S261. Further, in Step S262, the apparatus-specific information registration request unit 301 supplies the server 110 with the apparatus-specific information through the communication unit 214 of the company terminal apparatus 120. For example, the apparatus-specific information registration request unit 301 supplies the server 110 with apparatus-specific information as described above and a user ID to be linked to the apparatus-specific ID. At this time, signature metainformation or imaging parameters may also be supplied from the company terminal apparatus 120 to the server 110.

The apparatus-specific information registration unit 322 of the server 110 acquires the apparatus-specific information, the user ID, and the like through the communication unit 214 of the server 110 in Step S283. In Step S284, the signature metainformation generation unit 323 generates signature metainformation including the apparatus-specific ID, the user ID, the company name, and the like on the basis of those pieces of information. Note that the signature metainformation may be generated by the company terminal apparatus 120 to be supplied to the server 110.

The license key issuing unit 328 of the server 110 performs hash value verification in Step S285. That is, the license key issuing unit 328 decrypts, by using a secret key of the server 110, the apparatus-specific common key that is included in the supplied apparatus-specific information and that has been encrypted with the public key of the server 110. Then, the license key issuing unit 328 derives, by using the decrypted apparatus-specific common key, the hash value of the apparatus-specific ID and the apparatus-specific common key. Moreover, the license key issuing unit 328 compares the derived hash value and the hash value included in the supplied apparatus-specific information (hash value of apparatus-specific ID and apparatus-specific common key) to each other.

When the hash values coincide with each other and it is thus confirmed that no alteration has been made, the license key issuing unit 328 issues a license key as license information with respect to the company terminal apparatus 120. Information included in a license key has been described with reference to FIG. 5. Note that, here, the license key includes system-unique information and signature metainformation. The license key issuing unit 328 derives the hash value of the license key by using the apparatus-specific common key. Then, the license key issuing unit 328 supplies the company terminal apparatus 120 with the license key and the hash value.

In Step S263, the license key recording unit 305 of the company terminal apparatus 120 acquires the issued license key (and hash value thereof). When confirming the hash value, the license key recording unit 305 records the license key on a recording medium in Step S264.

When the camera 140 is rented to the user 30, the recording medium having recorded thereon the license key as described above is also rented. The user 30 mounts the recording medium on a predetermined position of the camera 140 when using the camera 140. Processing that is executed in the camera 140 thereafter is performed along the flow of FIG. 15, for example.

Figure 15:
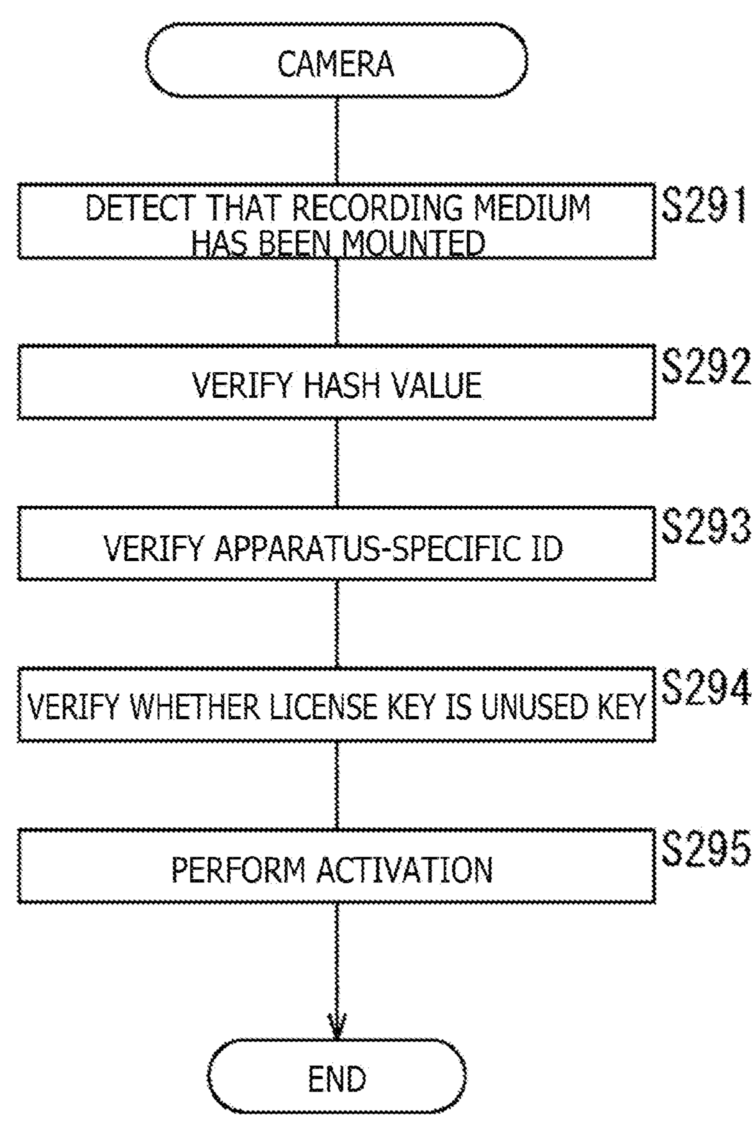
FIG. 15 is a flowchart following FIG. 10, illustrating the exemplary flow of activation processing.

The license key verification unit 443 of the camera 140 confirms that a recording medium having recorded thereon a license key has been mounted in Step S291 of FIG. 15. With the recording medium mounted on the predetermined position, the license key verification unit 443 verifies the license key recorded on the recording medium in Step S292. That is, the license key verification unit 443 verifies the hash value of the license key to verify whether or not the license key has been altered. For example, the license key verification unit 443 derives, by using the apparatus-specific common key of the camera 140, the hash value of a license key recorded on a recording medium. Then, the license key verification unit 443 compares the derived hash value and the hash value of the license key recorded on the recording medium to each other.

When the hash values coincide with each other and it is thus proved that the license key has not been altered, the license key verification unit 443 verifies the apparatus-specific ID included in the license key in Step S293.

In a case where the apparatus-specific ID is legitimate, the license key verification unit 443 determines whether or not the license key is an unused key in Step S294. License keys used in the past cannot be used. The license key verification unit 443 determines whether or not the license key is an unused key on the basis of the system-unique information, for example.

In a case where it is determined that the license key is an unused key, the activation processing unit 444 performs activation in Step S295. This allows the user 30 to use the camera 140.

Through the processing executed as described above, offline activation can be performed by using a recording medium.

Note that, also in this case, as in the case of online activation, license validity periods can also be set. That is, information indicating a validity period may be included in the license key issued by the license key issuing unit 328. In this case, it is sufficient that, as in the case of online activation (FIG. 10), after the signature metainformation is generated (after processing in Step S284 of FIG. 14), processing similar to that in Step S153 and Step S177 (FIG. 10) is performed to set a validity period, and that the license key verification unit 443 confirms whether or not it is within the validity period included in the license key at that point in time when verifying the license key (processing between Step S291 to Step S294 of FIG. 15).

Further, also in this case, as in the case of online activation, imaging parameters may be set and included in the license key issued by the license key issuing unit 328. In this case, it is sufficient that, as in the case of online activation (FIG. 12), after the signature metainformation is generated (after processing in Step S284 of FIG. 14), processing similar to that in Step S203 and Step S227 (FIG. 12) is performed to generate imaging parameters.

<Flow of Offline Processing 2>

Note that FIDO (Fast IDentity Online) may be applied to user authentication. In FIDO, instead of authentication using IDs and passwords, authentication using USB (Universal Serial Bus) keys having embedded therein secret keys (security tokens) or biological information such as fingerprints or irises is performed, for example.

An exemplary flow of activation processing in this case is described with reference to the flowcharts of FIG. 16 and FIG. 17. Note that the activation processing is performed offline. Further, license information includes neither validity period information nor imaging parameters. That is, the example of FIG. 16 and FIG. 17 corresponds to the example of FIG. 14 and FIG. 15.

The registration and linking of a user ID and an apparatus-specific ID and the issuing of a license key are performed similarly to those in the case described with reference to the flowcharts of FIG. 14 and FIG. 15. That is, the processing in Step S301 and Step S302 (FIG. 16) that is executed by the camera 140 is executed similarly to the processing in Step S251 and Step S252 (FIG. 14) described above. Further, the processing in Step S311 to Step S313 (FIG. 16) that is executed by the company terminal apparatus 120 is executed similarly to the processing in Step S261 to Step S263 (FIG. 14) described above. Moreover, the processing in Step S321 (FIG. 16) that is executed by the user terminal apparatus 130 is executed similarly to the processing in Step S271 (FIG. 14) described above. Further, the processing in Step S331 to Step S336 (FIG. 16) that is executed by the server 110 is executed similarly to the processing in Step S281 to Step S286 (FIG. 14) described above.

However, in this case, a processing unit 332 of the user terminal apparatus 130 registers a FIDO public key of the user in addition to the user. Note that user registration and user FIDO public key registration may be executed simultaneously or independently. A FIDO public key is included in a license key to be supplied to the camera 140, thereby being used by the user authentication unit 445 for FIDO user authentication. That is, the license key issued by the license key issuing unit 328 includes the FIDO public key.

In this case, the license key recording unit 305 of the company terminal apparatus 120 supplies the camera 140 with the license key acquired in Step S313 to cause the license key to be recorded, in Step S314. The camera 140 acquires the license key and records the license key on a recording medium or the like in Step S303. A license key can be supplied from the company terminal apparatus 120 to the camera 140 in any way. For example, a license key may be supplied by using a removable recording medium or by communication.

When the camera 140 is rented to the user 30, the camera 140 is rented with a license key as described above recorded on a removable recording medium mounted on the camera 140 or on an internal memory, for example. The user 30 to whom the camera 140 has been rented performs activation by using the camera 140. This processing is performed along the flow of FIG. 17, for example.

Figure 17:
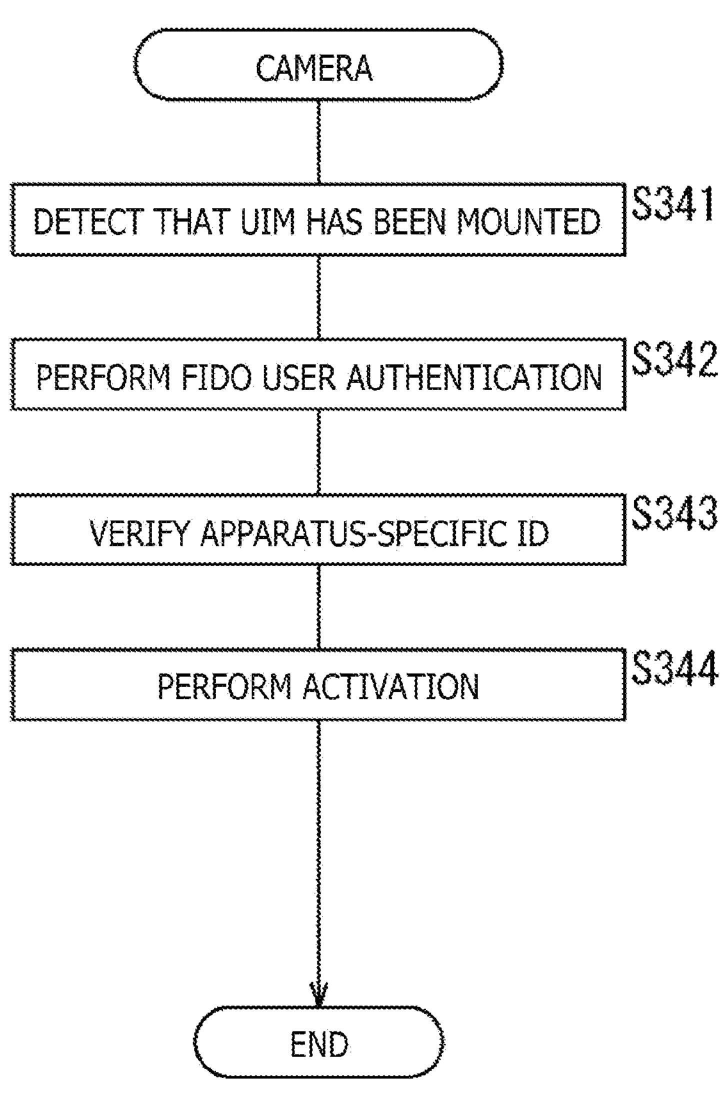
FIG. 17 is a flowchart following FIG. 10, illustrating the exemplary flow of activation processing.

The user authentication unit 445 of the camera 140 detects that a UIM (User Identity Module) card has been mounted on a predetermined position of the camera 140 in Step S341 of FIG. 17.

With the UIM card mounted, the user authentication unit 445 performs FIDO user authentication by using the FIDO public key included in the license key in Step S342.

In Step S343, the license key verification unit 443 verifies the apparatus-specific ID included in the license key.

When it is determined that the apparatus-specific ID is a legitimate ID, the activation processing unit 444 performs activation in Step S344. This allows the user 30 to use the camera 140.

Through the processing executed as described above, offline activation can be performed by using FIDO.

Note that, also in this case, as in the case of online activation, license validity periods can also be set. That is, information indicating a validity period may be included in the license key issued by the license key issuing unit 328. In this case, it is sufficient that, as in the case of online activation (FIG. 10), after the signature metainformation is generated (after processing in Step S334 of FIG. 16), processing similar to that in Step S153 and Step S177 (FIG. 10) is performed to set a validity period, and that the license key verification unit 443 confirms whether or not it is within the validity period included in the license key at that point in time when verifying the license key (before or after the processing in Step S343 of FIG. 17).

Further, also in this case, as in the case of online activation, imaging parameters may be set and included in the license key issued by the license key issuing unit 328. In this case, it is sufficient that, as in the case of online activation (FIG. 12), after the signature metainformation is generated (after processing in Step S334 of FIG. 16), processing similar to that in Step S203 and Step S227 (FIG. 12) is performed to generate imaging parameters.

<Flow of Imaging Control Processing>

After activation is performed in various ways as described above, the user 30 images a subject by using the camera 140 to generate captured images. At this time, imaging control, imaging setting, electronic signature generation, and the like are performed on the basis of information included in license information. An exemplary flow of such imaging control processing that is performed in the camera 140 is described with reference to the flowchart of FIG. 18.

When the imaging control processing starts, the terms of use determination unit 446 determines whether or not usage limitation conditions (terms of use) based on imaging parameters included in license information (including license key) are met in Step S401. That is, the terms of use determination unit 446 confirms the imaging parameters included in the license information to determine whether or not the terms of use set with the imaging parameters are met.

For example, as described with reference to FIG. 5, with imaging parameters, locations or dates and times in which the use of a camera (imaging) is allowed can be set. For example, in a case where it is determined that such terms of use are met, that is, in a case where imaging is allowed, the processing proceeds to Step S402.

In Step S402, the imaging setting unit 447 sets imaging functions (specifications) on the basis of the imaging parameters included in the license information. For example, the imaging setting unit 447 sets the resolution of captured images and the like on the basis of imaging parameters. With this, captured images can be generated with the functions (specifications) designated by the imaging parameters included in the license information.

In Step S403, the imaging control unit 448 controls the imaging unit 431 to image a subject, thereby generating a captured image.

The electronic signature processing unit 449 generates an electronic signature by using the license information in Step S404 and associates the generated electronic signature with the captured image in Step S405. When the processing in Step S405 ends, the imaging control processing ends. Further, in a case where it is determined that the terms of use are not met in Step S401, the imaging control processing ends since imaging is not to be performed.

Through the imaging control processing executed as described above, license information-based imaging control can be performed. Note that, in a case where moving images are captured, it is sufficient that such imaging control processing is performed in every frame.

<Electronic Signature Generation>

Figure 18:
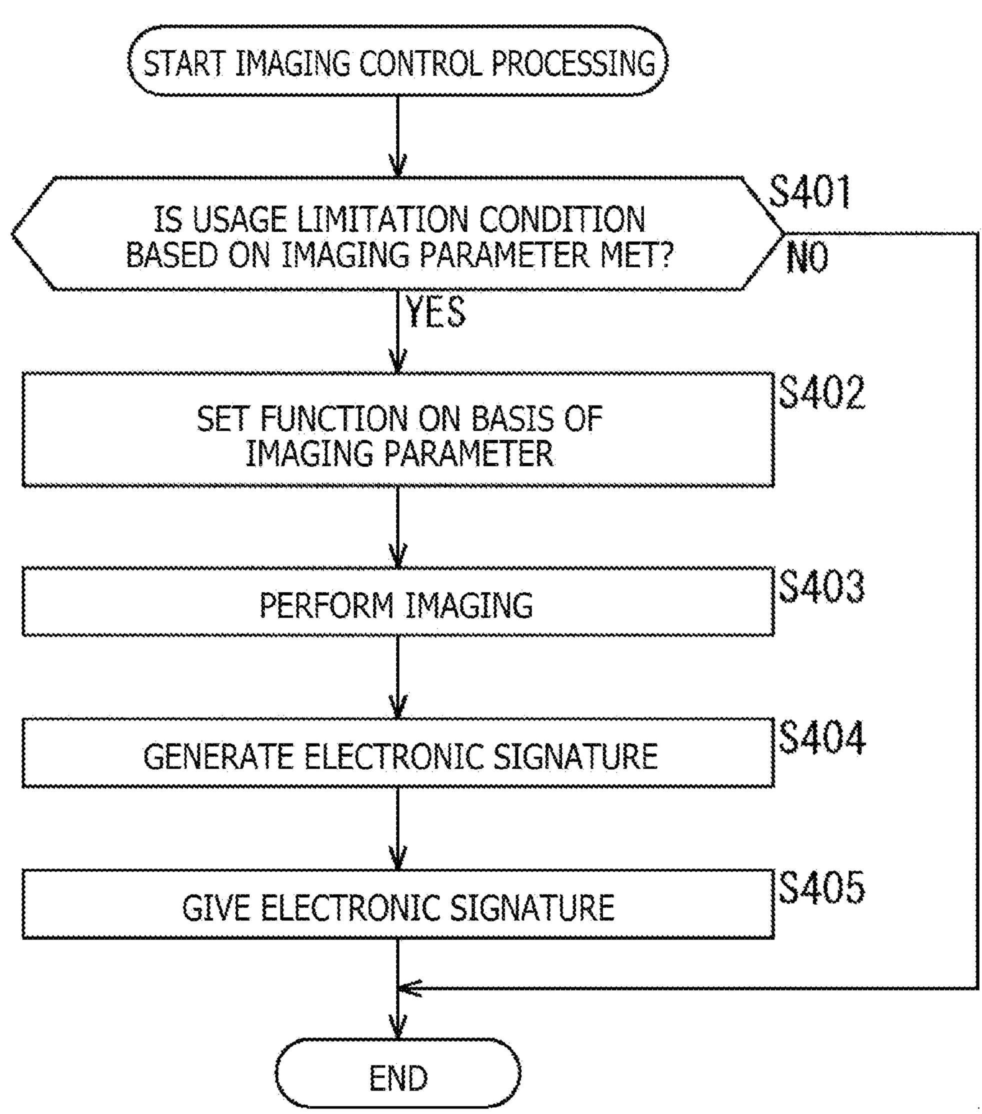
FIG. 18 is a flowchart illustrating an exemplary flow of imaging control processing.
Figure 19:
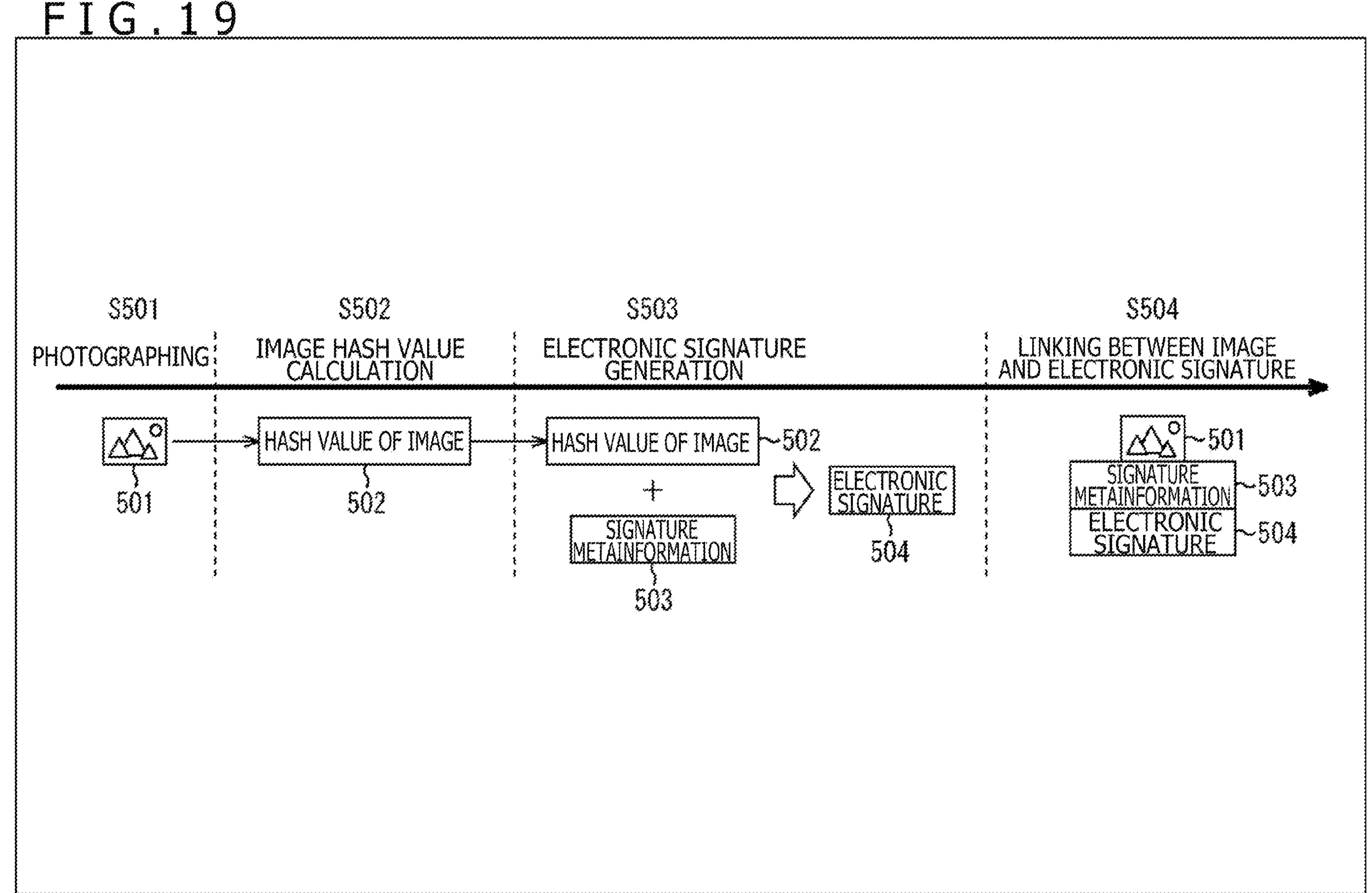
FIG. 19 is a diagram illustrating an exemplary flow of electronic signature generation processing.

An exemplary method for electronic signature generation in Step S404 of FIG. 18 is described with reference to FIG. 19. When a subject is imaged to generate a captured image 501 (S501), a hash value 502 of the captured image 501 is derived by using the apparatus-specific common key (S502).

Then, an electronic signature 504 is generated by using the hash value 502 and signature metainformation 503 included in the license information (S503). The signature metainformation 503 includes information such as an apparatus-specific ID, a user ID, and a company name as described above. Further, the electronic signature 504 is generated by any method. For example, the signature metainformation 503 may be added to the hash value 502 of an image, the hash value of them may be derived by using the apparatus-specific common key of the camera 140, and the hash value may be encrypted with the public key of the server, to thereby generate the electronic signature 504. Further, the hash value may be encrypted by using a secret key to generate the electronic signature 504. Further, the hash value may be encrypted by using a common key to generate the electronic signature 504.

Then, the signature metainformation 503 and the electronic signature 504 are associated with the captured image 501 (S504). Note that whether or not to associate an electronic signature and signature metainformation with a captured image may be controlled according to the details of a license. Further, whether or not to associate an electronic signature and signature metainformation with a captured image may be controlled according to the validity period of a license.

<Electronic Signature Verification>

Figure 20:
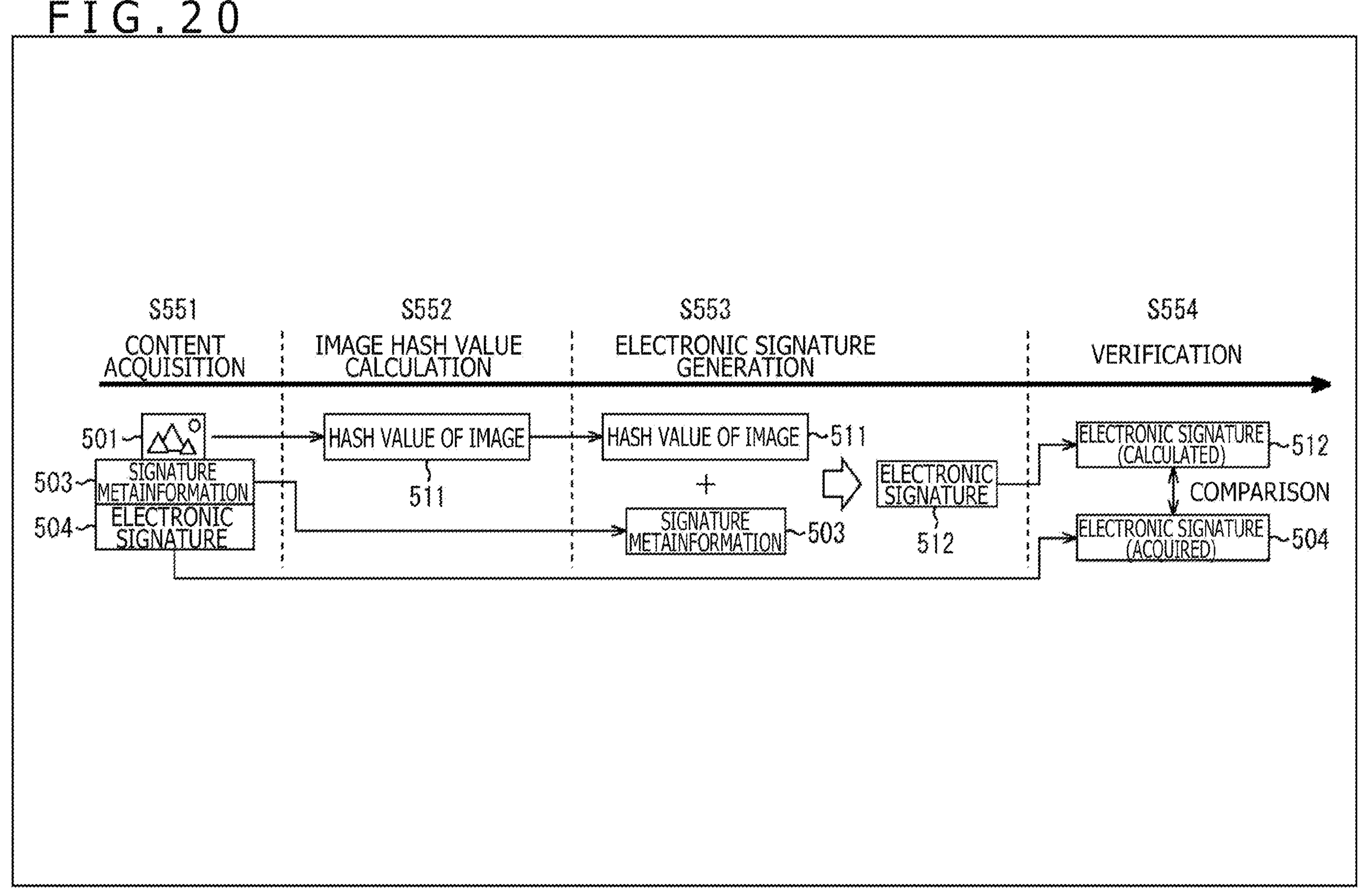
FIG. 20 is a diagram illustrating an exemplary flow of electronic signature verification processing.

An exemplary method of verifying an electronic signature associated with a captured image as described above is described with reference to FIG. 20. When the captured image 501 as well as the signature metainformation 503 and the electronic signature 504 that are associated with the captured image 501 are acquired as content (S551), a hash value 511 of the captured image 501 is derived by using the apparatus-specific common key of the camera 140 (S552).

Then, an electronic signature 512 is generated by using the hash value 511 and the acquired signature metainformation 503 (signature metainformation 503 associated with captured image 501) (S553). The signature metainformation 503 includes information such as an apparatus-specific ID, a user ID, and a company name as described above. Further, the electronic signature 504 may be generated by any method similar to that in the case of FIG. 19.

Then, the derived electronic signature 512 and the acquired electronic signature 504 (electronic signature 504 associated with captured image 501) are compared to each other to perform electronic signature verification (S554).

Note that the acquired electronic signature 504 may be decrypted by using the secret key of the server or the like to derive the hash value 502 of an image and the hash value of the signature metainformation 503 and the hash values may be compared to the hash value 511 of the image and the hash value of the signature metainformation 503, to thereby perform electronic signature verification.

With this, alterations of captured images and signature metainformation (apparatus-specific ID, user ID, and company name) can be detected (authenticity of captured images and signature metainformation (apparatus-specific ID, user ID, and company name) can be guaranteed).

Here, an apparatus-specific ID indicates a device used for generating captured images (imaging). Further, a user ID indicates a photographer (a person who has generated captured images). Moreover, a company name indicates the owner of the rights of captured images (owner of captured images). That is, with signature metainformation included in electronic signatures, the authenticity of a device used for imaging, a photographer, the owner (right holder) of captured images, and the like can be guaranteed.

Application Example

Note that, although the company 10 is used as the provider of the camera 140 (owner of captured images) in the description of the rental system 100, the provider of the camera 140 (owner of captured images) is not limited to a company and may be an individual or an organization. Further, although the user 30 of the camera 140 is an individual in the description, the user 30 is not limited thereto and may be a company or an organization, for example.

Further, the way of providing the camera 140 is freely determined and may be ways other than rental. For example, the camera 140 may be transferred to the user 30. Further, a contract that the camera 140 is returned to the company 10 after the camera 140 has been rented to the user 30 for a certain period or a contract that the camera 140 is transferred to the user 30 after the camera 140 has been rented to the user 30 for a certain period may be formed.

Further, in the above, the camera 140 (that is, imaging apparatus) is described as an exemplary product to be provided, but products to be provided are freely determined and may be products other than imaging apparatuses. For example, recording apparatuses or any electronic apparatuses may be provided.

3. Supplementary Note

<Hardware>

The series of processing processes described above can be executed by software (application program) or hardware.

<Application Target of Present Technology>

The present technology is applicable to any configuration. For example, the present technology can also be implemented as a part of an apparatus, such as a processor serving as a system LSI (Large Scale Integration) or the like, a module that uses multiple processors or the like, a unit that uses multiple modules or the like, or a set that includes other additional functions in addition to a unit.

Further, for example, the present technology is also applicable to a network system including multiple apparatuses. For example, the present technology may be implemented as cloud computing in which multiple apparatuses share processing in cooperation with each other via a network. For example, the present technology may be implemented in a cloud service for providing a service to any terminal such as computers, portable information processing terminals, or IoT (Internet of Things) devices.

Note that, herein, "system" means a set of multiple components (apparatuses, modules (parts), or the like), and it does not matter whether or not all the components are in a single housing. Thus, multiple apparatuses that are accommodated in separate housings and connected to each other via a network and a single apparatus in which multiple modules are accommodated in a single housing are both "system."

Systems, apparatuses, processing units, and the like to which the present technology is applied can be used in any field such as traffic, medical care, crime prevention, agriculture, livestock raising, mining, beauty business, factories, home electronics, meteorology, or natural surveillance. Further, such systems, apparatuses, processing units, and the like can be used for any purpose.

<Others>

The embodiment of the present technology is not limited to the embodiment described above, and various modifications can be made within the scope of the gist of the present technology.

For example, the configuration described as a single apparatus (or processing unit) may be divided into multiple apparatuses (or processing units). In contrast, the configurations described above as multiple apparatuses (or processing units) may be put into a single apparatus (or processing unit). Further, needless to say, configurations other than those described above may be added to the configuration of each apparatus (or each processing unit). Moreover, as long as the configuration and operation of the entire system is substantially unchanged, the configuration of a certain apparatus (or processing unit) may be partially included in the configuration of another apparatus (or another processing unit).

Further, for example, the program described above may be executed by any apparatus. In this case, it is sufficient that the apparatus has necessary functions (functional blocks or the like) and can thus obtain necessary information.

Further, for example, the steps of a single flowchart may be executed by a single apparatus or shared and executed by multiple apparatuses. Moreover, in a case where multiple processing processes are included in a single step, the multiple processing processes may be executed by a single apparatus or shared and executed by multiple apparatuses. In other words, multiple processing processes included in a single step can be executed as processing in multiple steps. In contrast, the processing processes described as multiple steps can collectively be executed as a single step.

Further, for example, as for the program that is executed by the computer, the processing processes in the steps describing the program may be executed chronologically in the order described herein or in parallel. Alternatively, the processing processes may be individually executed at right timings, for example, when the program is called. That is, as long as no contradiction arises, the processing processes in the respective steps may be executed in an order different from the order described above. Moreover, the processing in the steps describing the program may be executed in parallel or in combination with the processing of another program.

Further, for example, the multiple technologies according to the present technology can be implemented independently of each other as long as no contradiction arises. Needless to say, the multiple present technologies can be implemented in any combination. For example, part or whole of the present technology described in any embodiment can be implemented in combination with part or whole of the present technology described in another embodiment. Further, part or whole of any of the present technologies described above can also be implemented in combination with another technology not described above.

Note that the present technology can also take the following configurations.

(1) An imaging apparatus including:

an association unit configured to associate a captured image with a hash value of signature metadata including imaging apparatus identification information that is identification information regarding the imaging apparatus itself and user identification information.

(2) The imaging apparatus according to Item (1), in which the signature metadata further includes a company name of a company that provides a user with the imaging apparatus.

(3) The imaging apparatus according to Item (1) or (2), in which the association unit associates the captured image with the hash value derived from the signature metadata included in license information that is information regarding a license.

(4) The imaging apparatus according to Item (3), in which the association unit associates, according to a detail of the license, the hash value of the signature metadata and the captured image with each other.

(5) The imaging apparatus according to Item (3) or (4), in which the association unit associates, according to a validity period included in the license information, the hash value of the signature metadata and the captured image with each other.

(6) The imaging apparatus according to any one of Items (1) to (5), in which the association unit generates an electronic signature including the hash value of the signature metadata and associates the generated electronic signature with the captured image.

(7) The imaging apparatus according to Item (6), in which the association unit converts the captured image into a hash value, converts the hash value of the captured image and the signature metadata into a hash value, and encrypts the hash value, to thereby generate the electronic signature.

(8) The imaging apparatus according to Item (6) or (7), in which the association unit further associates the signature metadata with the captured image associated with the electronic signature.

(9) An information processing method including: associating a captured image with a hash value of signature metadata including imaging apparatus identification information that is identification information regarding an imaging apparatus and user identification information.

(10) A program for causing a computer to function as:

an association unit configured to associate a captured image with a hash value of signature metadata including imaging apparatus identification information that is identification information regarding an imaging apparatus and user identification information.

(11) An imaging apparatus including:

an imaging control unit configured to control imaging on the basis of license information that is information regarding a license and includes imaging apparatus identification information that is identification information regarding the imaging apparatus itself, user identification information, and an imaging parameter that is a parameter for imaging.

(12) The imaging apparatus according to Item (11), in which the imaging parameter includes information regarding a term of use of the imaging apparatus.

(13) The imaging apparatus according to Item (12), in which the term of use relates to a location, a time, or both of them.

(14) The imaging apparatus according to Item (12) or (13), in which the term of use relates to a subject.

(15) The imaging apparatus according to any one of Items (11) to (14), in which the imaging parameter includes information regarding imaging setting.

(16) The imaging apparatus according to Item (15), in which the information regarding imaging setting includes information regarding a resolution of a captured image.

(17) The imaging apparatus according to Item (15) or (16), in which the information regarding imaging setting includes information regarding addition of a credit to a captured image.

(18) The imaging apparatus according to any one of Items (11) to (17), in which the license information further includes information indicating a validity period of the license.

(19) An information processing method including:

controlling imaging on the basis of license information that is information regarding a license and includes imaging apparatus identification information that is identification information regarding an imaging apparatus, user identification information, and an imaging parameter that is a parameter for imaging.

(20) A program for causing a computer to function as:

an imaging control unit configured to control imaging on the basis of license information that is information regarding a license and includes imaging apparatus identification information that is identification information regarding an imaging apparatus itself, user identification information, and an imaging parameter that is a parameter for imaging.

REFERENCE SIGNS LIST

10: Company
30 to 34: User
100: Rental system
110: Server
120: Company terminal apparatus
130: User terminal apparatus
140: Camera
301: Apparatus-specific ID registration unit
302: Linking processing unit
311: User ID registration unit
321: User ID generation unit
322: Apparatus-specific ID registration unit
323: Signature metainformation generation unit
324: Validity period setting unit
325: Imaging parameter generation unit
326: User confirmation unit
327: License key issuing unit
431: Imaging unit

441: Login processing unit
442: License key verification unit
443: Validity period confirmation unit
444: Terms of use determination unit
445: Imaging setting unit
446: Imaging control unit
447: Electronic signature processing unit

The invention claimed is:

1. An imaging apparatus comprising:

circuitry configured to associate a first hash value of a captured image with signature metadata including imaging apparatus identification information that is identification information regarding the imaging apparatus itself and user identification information to generate linked data, convert the linked data generated using the first hash value of the captured image associated with the signature metadata to a second hash value, and generate, based on the second hash value, an electronic signature associated with the captured image, wherein the first hash value of the captured image is derived using a key applied to the captured image, wherein the signature metadata includes an apparatus-specific ID, a user ID, and a company name of a company that provides a user with the imaging apparatus, and wherein the second hash value is derived using the key applied to the linked data generated using the first hash value of the captured image associated with the signature metadata.

2. The imaging apparatus according to claim 1, wherein the circuitry is further configured to associate the captured image with the second hash value derived from the signature metadata included in license information that is information regarding a license.

3. The imaging apparatus according to claim 2, wherein the circuitry associates, according to a detail of the license, the second hash value derived from the signature metadata and the captured image with each other.

4. The imaging apparatus according to claim 2, wherein the circuitry associates, according to a validity period included in the license information, the first hash value of the signature metadata and the captured image with each other.

5. The imaging apparatus according to claim 1, wherein the circuitry generates the electronic signature including the second hash value derived from the signature metadata and associates the generated electronic signature with the captured image.

6. The imaging apparatus according to claim 5, wherein the circuitry is further configured to convert the captured image into the first hash value, and encrypt the first hash value, to thereby generate the electronic signature.

7. The imaging apparatus according to claim 5, wherein the circuitry is further configured to associate the signature metadata with the captured image associated with the electronic signature.

8. An information processing method comprising:

associating a first hash value of a captured image with signature metadata including imaging apparatus identification information that is identification information regarding an imaging apparatus and user identification information to generate linked data;

converting the linked data generated based on the first hash value of the captured image associated with the signature metadata to a second hash value; and generating, based on the second hash value, an electronic signature associated with the captured image, wherein the first hash value of the captured image is derived using a key applied to the captured image, wherein the signature metadata includes an apparatus-specific ID, a user ID, and a company name of a company that provides a user with the imaging apparatus, and wherein the second hash value is derived using the key based on applied to the linked data generated using the first hash value of the captured image associated with the signature metadata.

9. A non-transitory computer-readable storage medium having embodied thereon a program, which when executed by a computer causes the computer to execute a method, the method comprising:

associating a first hash value of a captured image with signature metadata including imaging apparatus identification information that is identification information regarding an imaging apparatus and user identification information to generate linked data;

converting the linked data generated using the first hash value of the captured image associated with the signature metadata to a second hash value; and generating, based on the second hash value, an electronic signature associated with the captured image, wherein the first hash value of the captured image is derived using a key applied to the captured image, wherein the signature metadata includes an apparatus-specific ID, a user ID, and a company name of a company that provides a user with the imaging apparatus, and wherein the second hash value is derived using the key applied to the linked data generated using the first hash value of the captured image associated with the signature metadata.

10. An imaging apparatus comprising:

circuitry configured to control imaging based on a first hash value of a captured image associated with signature metadata of license information that is information regarding a license for the captured image, wherein the signature metadata includes imaging apparatus identification information that is identification information regarding the imaging apparatus itself, user identification information, and an imaging parameter that is a parameter for imaging, wherein the first hash value of the captured image is derived using a key applied to the captured image, wherein the circuitry further controls the imaging based on a second hash value derived using the key applied to linked data generated using the first hash value of the captured image associated with the signature metadata of the license information, and wherein the license information further includes information indicating a validity period of the license.

11. The imaging apparatus according to claim 10, wherein the imaging parameter includes information regarding a term of use of the imaging apparatus.

12. The imaging apparatus according to claim 11, wherein the term of use relates to at least one of a location or a time.

13. The imaging apparatus according to claim 11, wherein the term of use relates to a subject.

14. The imaging apparatus according to claim 10, wherein the imaging parameter includes information regarding imaging setting.

15. The imaging apparatus according to claim 14, wherein the information regarding imaging setting includes information regarding a resolution of the captured image.

16. The imaging apparatus according to claim 14, wherein the information regarding imaging setting includes information regarding addition of a credit to the captured image.

17. An information processing method comprising:

controlling imaging based on a first hash value of a captured image associated with signature metadata of license information that is information regarding a license for a captured image and includes imaging apparatus identification information that is identification information regarding an imaging apparatus, user identification information, and an imaging parameter that is a parameter for imaging, wherein the first hash value of the captured image is derived using a key applied to the captured image, wherein the imaging is further controlled based on a second hash value derived using the key applied to linked data generated using the first hash value of the captured image associated with the signature metadata of the license information, and wherein the license information further includes information indicating a validity period of the license.

18. A non-transitory computer-readable storage medium having embodied thereon a program, which when executed by a computer causes the computer to execute a method, the method comprising:

controlling imaging based on a first hash value of a captured image associated with signature metadata of license information that is information regarding a license for a captured image and includes imaging apparatus identification information that is identification information regarding an imaging apparatus itself, user identification information, and an imaging parameter that is a parameter for imaging, wherein the first hash value of the captured image is derived using a key applied to the captured image, wherein the imaging is further controlled based on a second hash value derived using the key applied to linked data generated using the first hash value of the captured image associated with the signature metadata of the license information, and wherein the license information further includes information indicating a validity period of the license.

19. The imaging apparatus according to claim 1, wherein the second hash value is encrypted before generating the electronic signature.

20. The imaging apparatus according to claim 1, wherein the first hash value is derived using the key based on linked data generated based on the apparatus-specific ID, the user ID, and the company name.

* * * * *